Aug. 19, 1930.    J. H. CHADBOURNE    1,773,345
MACHINE FOR MANUFACTURING LOOM PICKERS
Filed Jan. 22, 1929    23 Sheets-Sheet 1

Inventor
Joseph H. Chadbourne
by James R. Hodder
Attorney

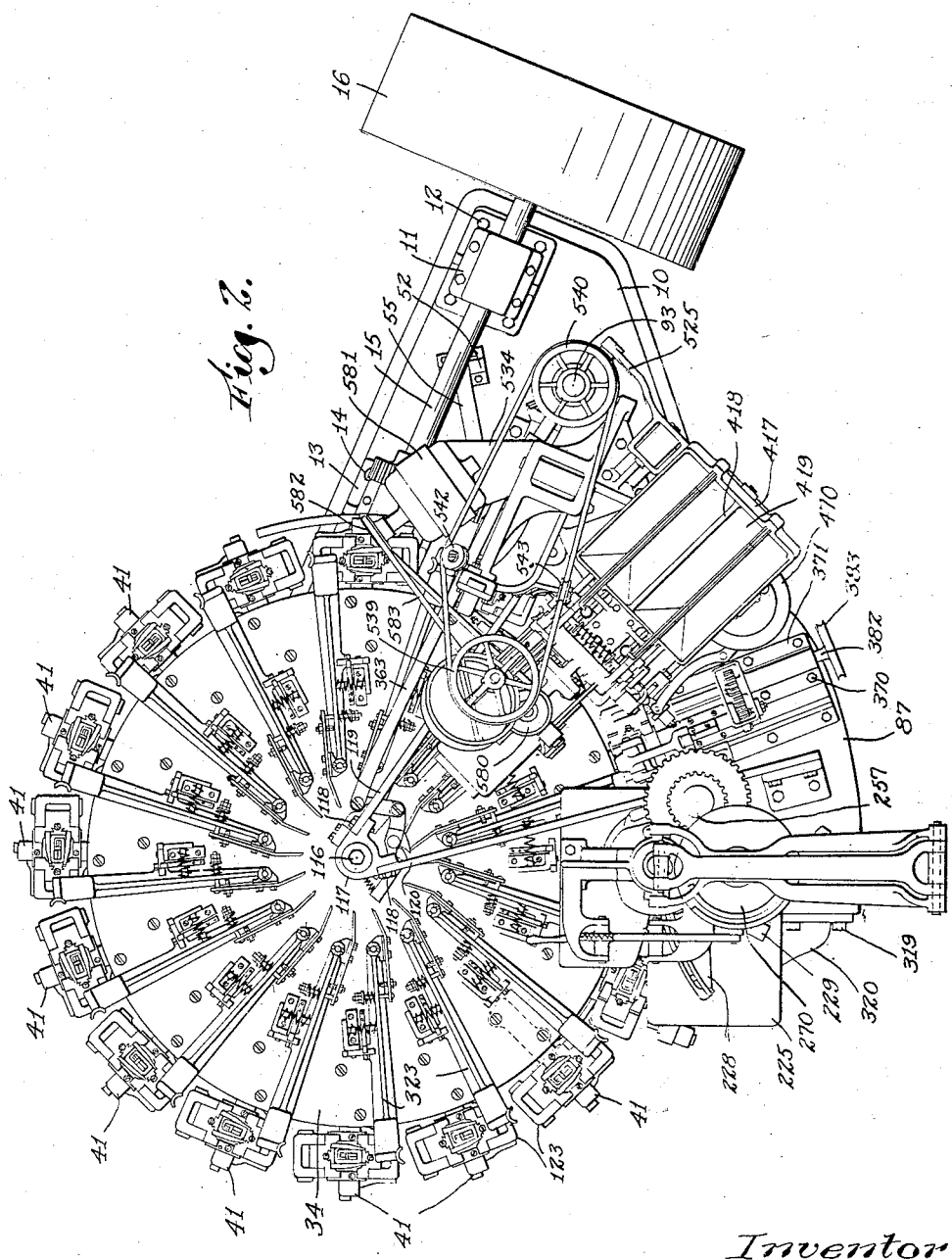

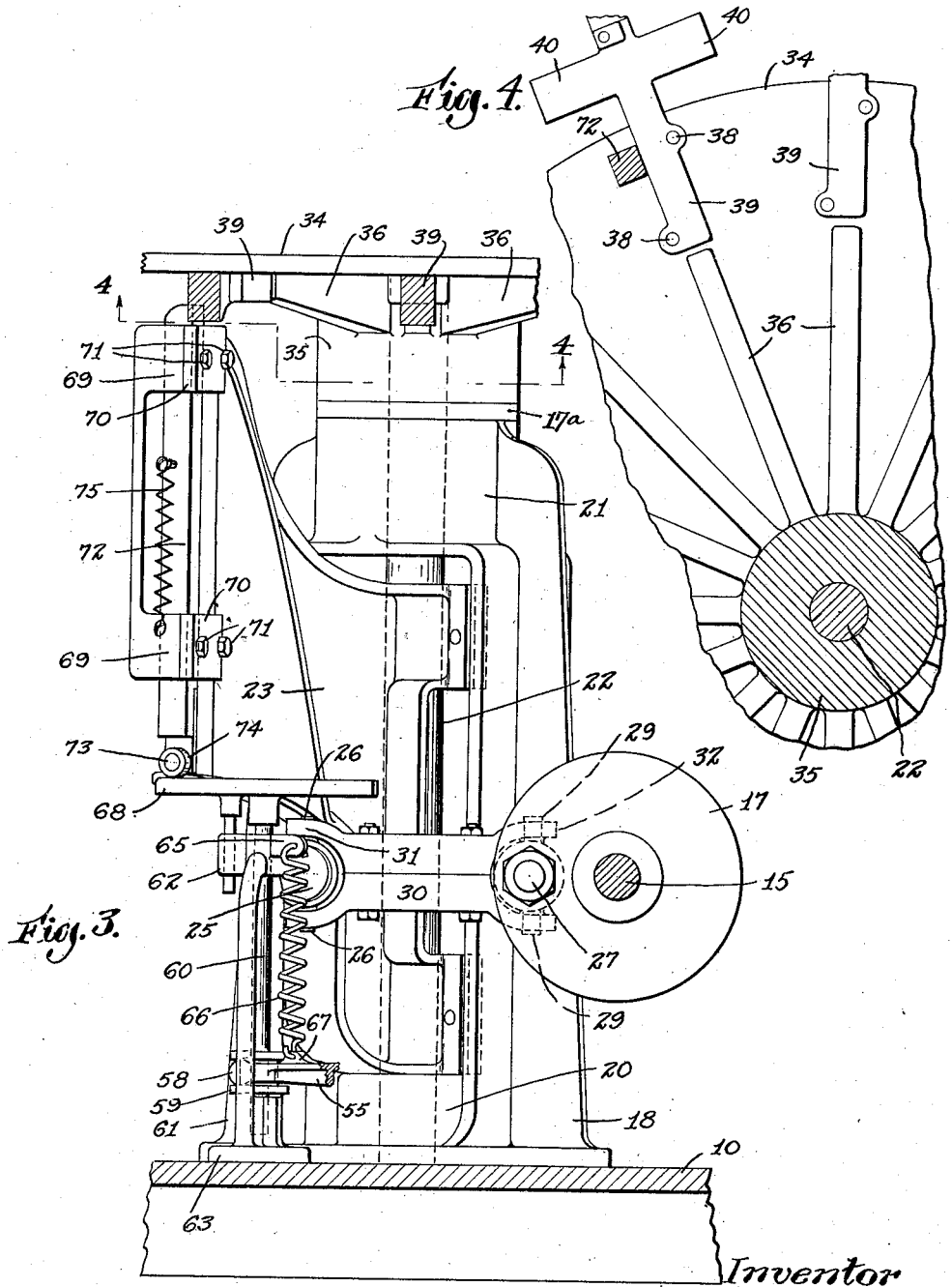

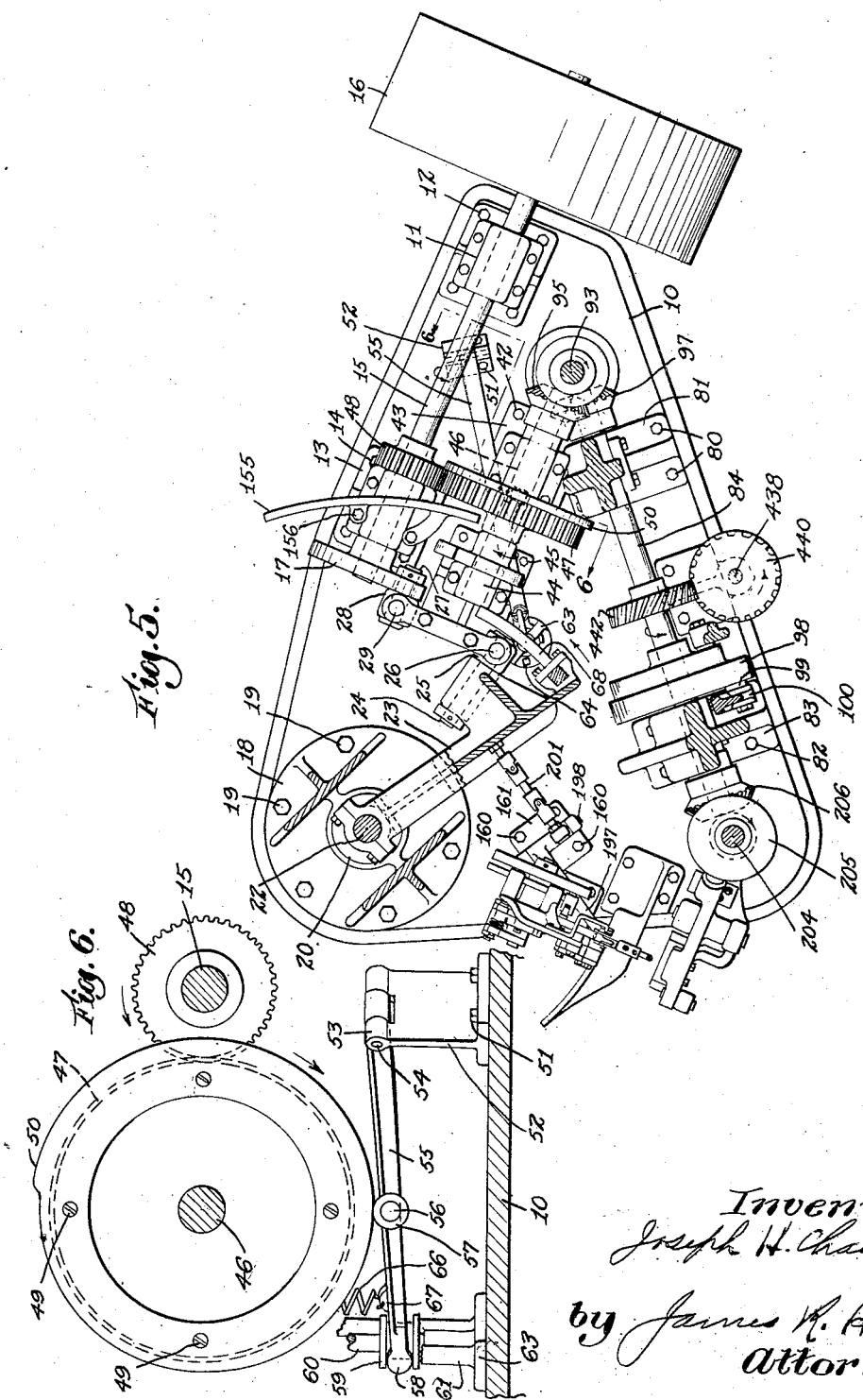

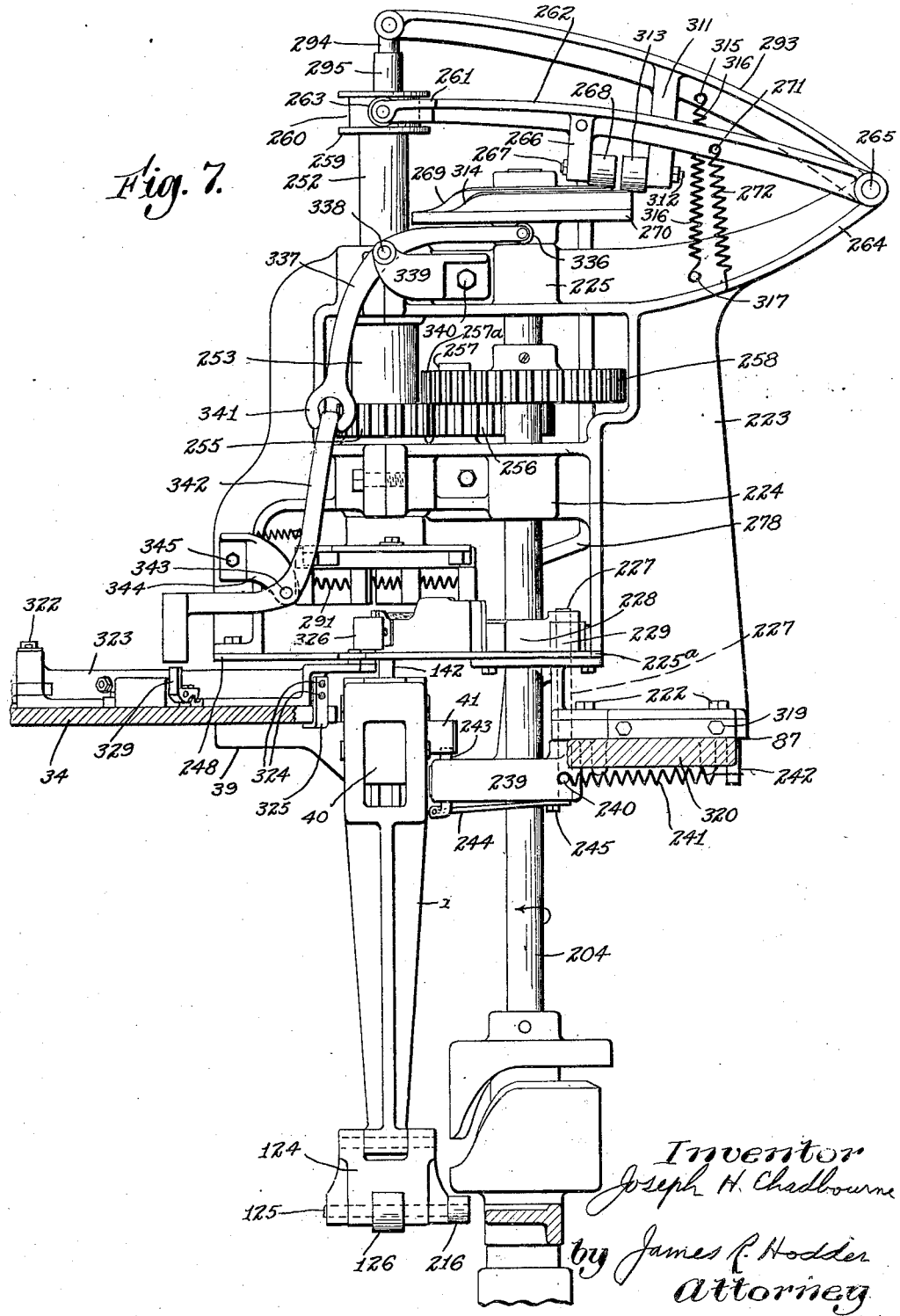

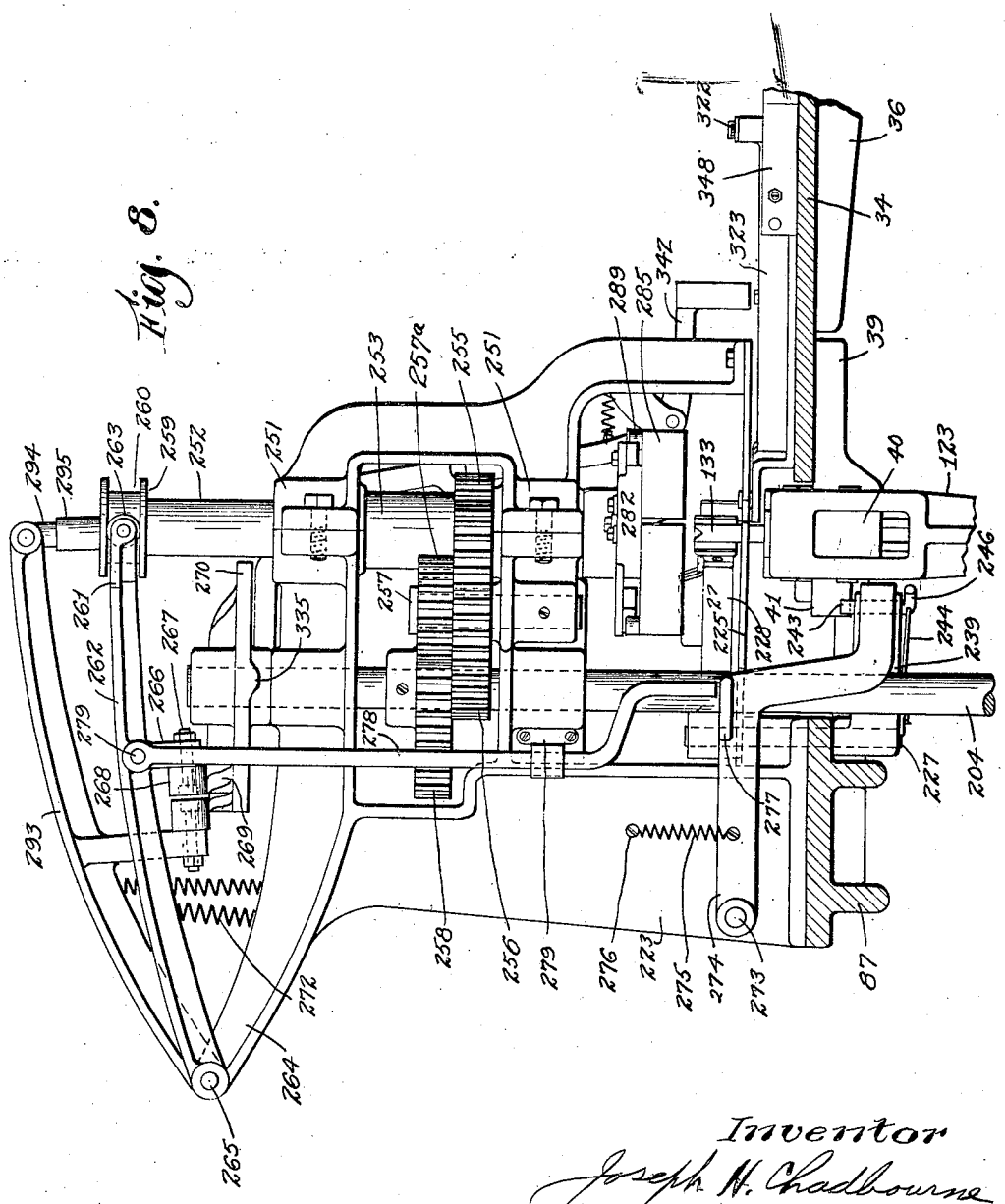

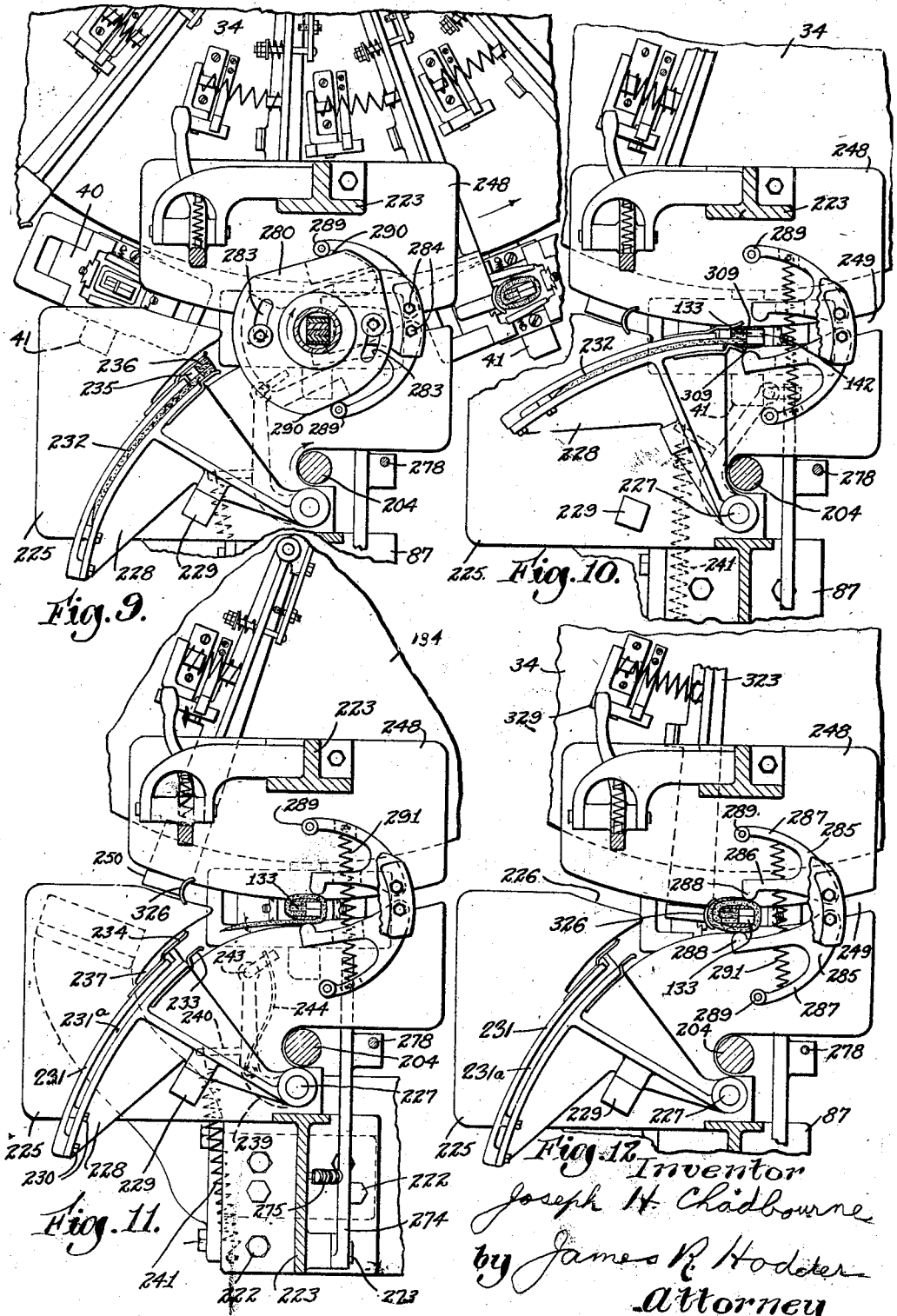

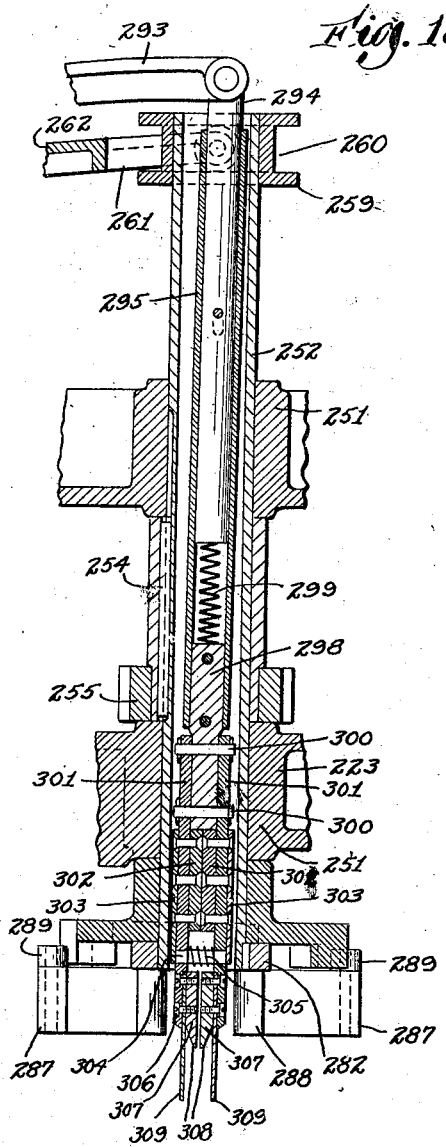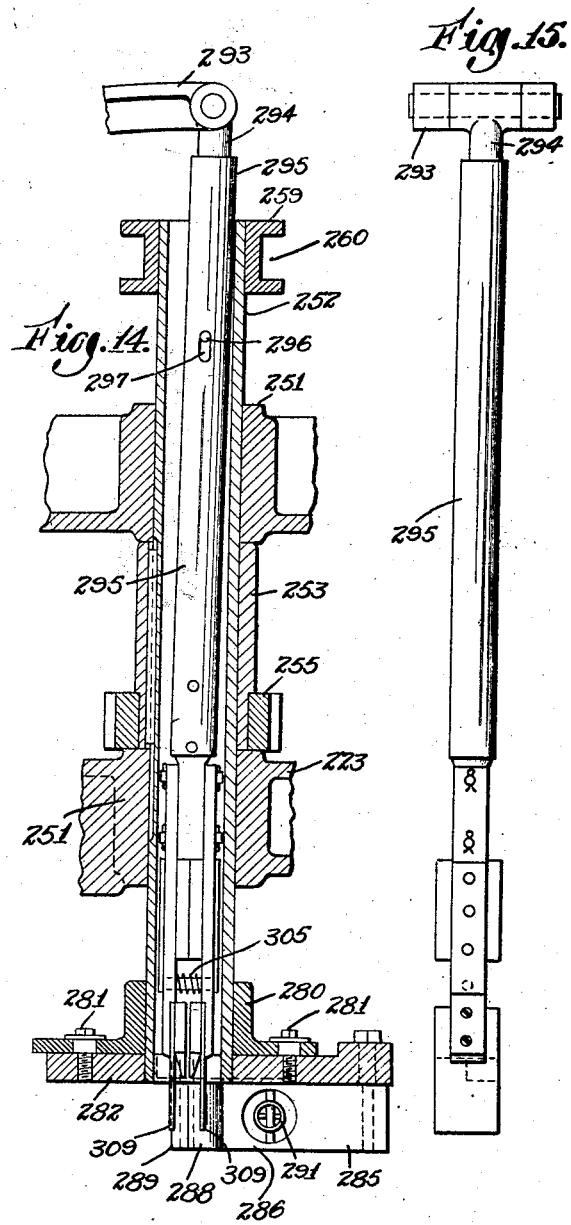

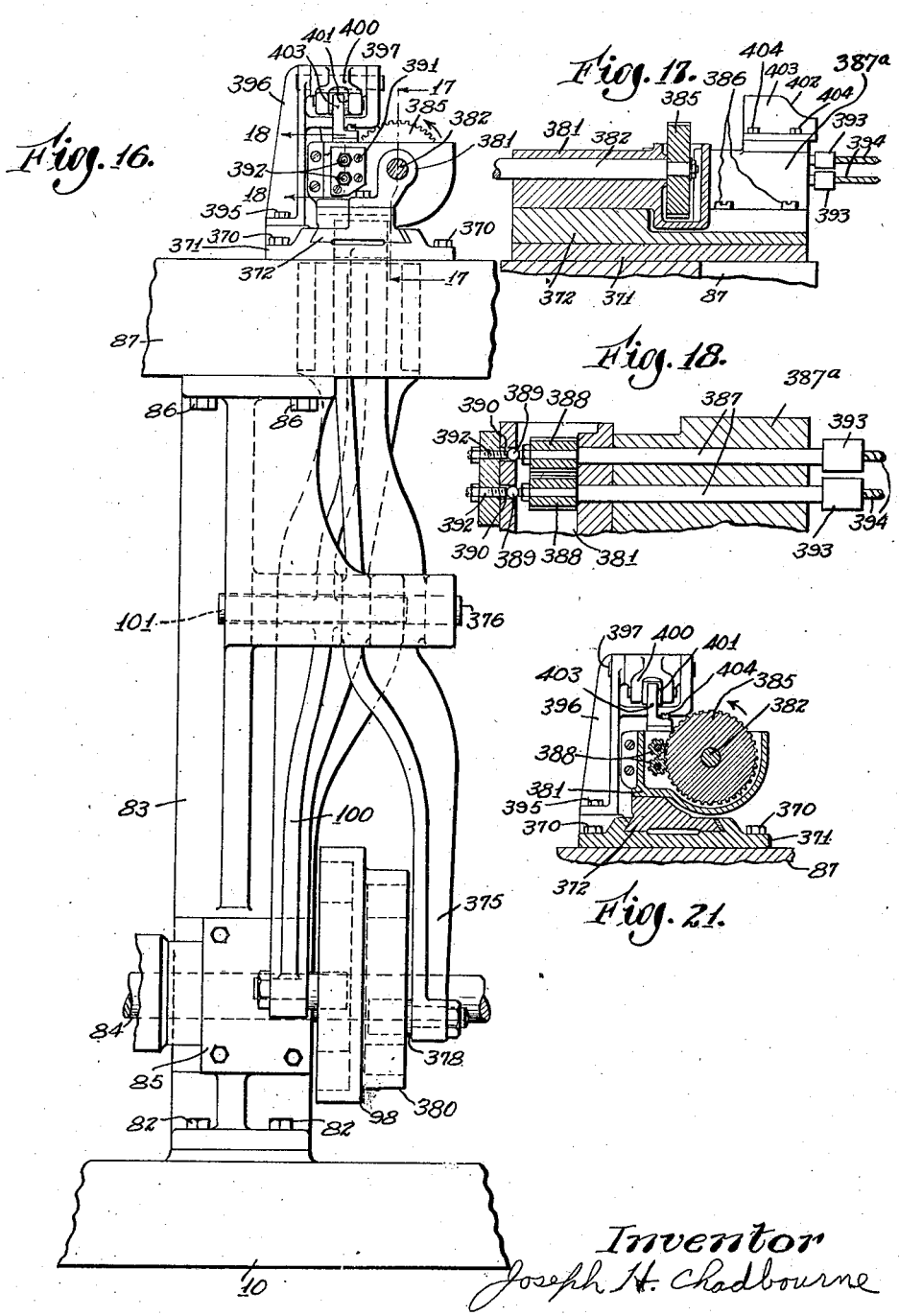

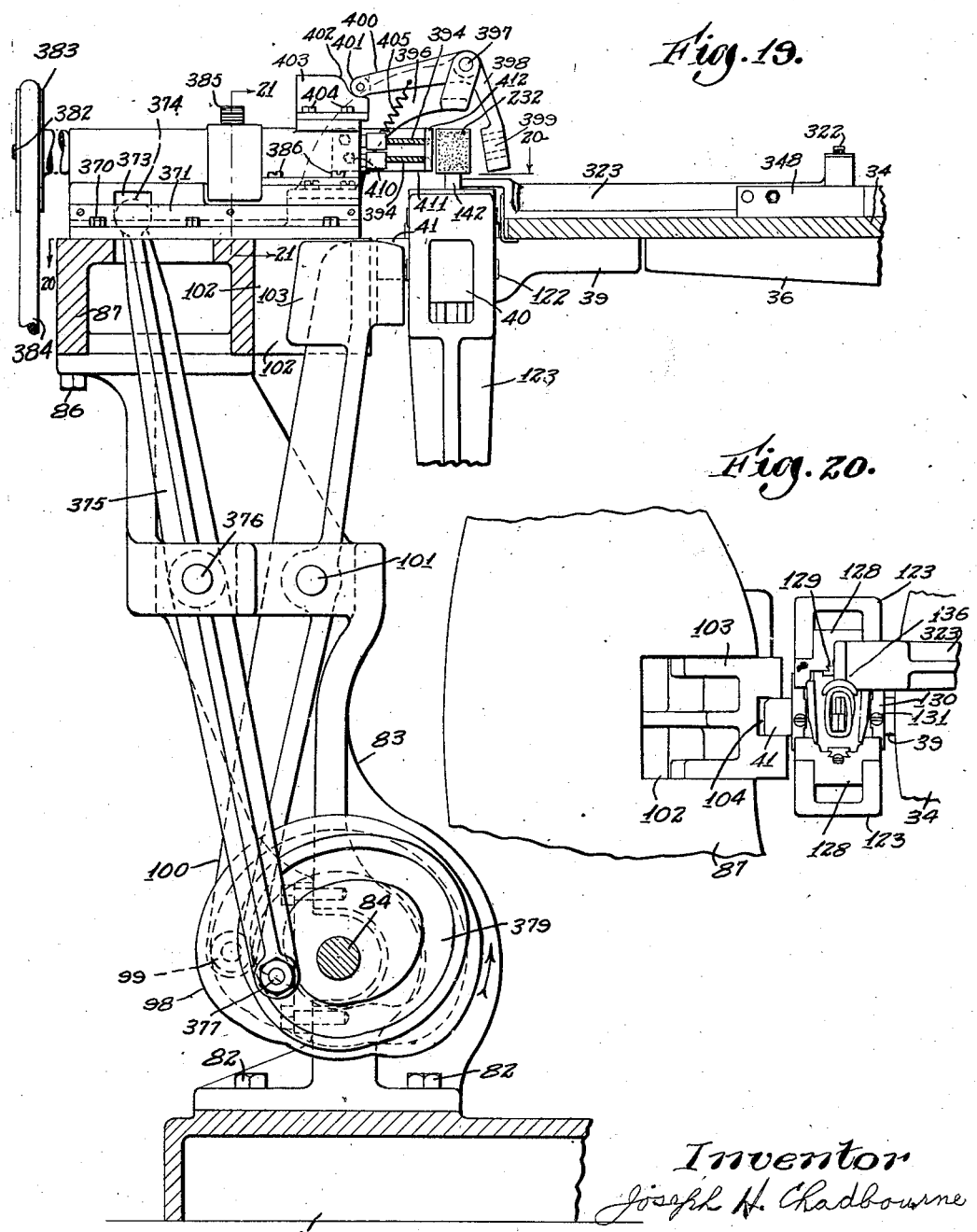

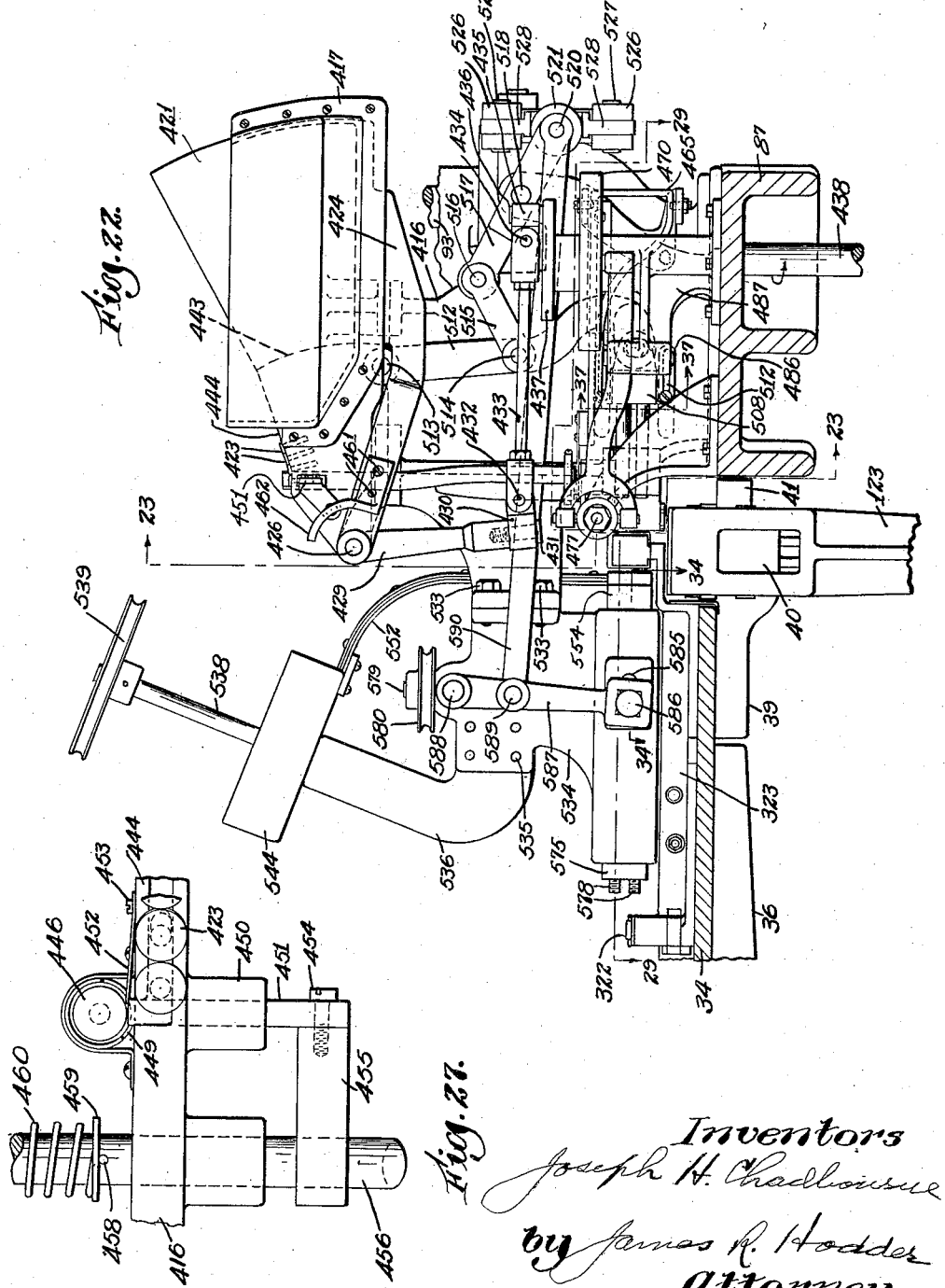

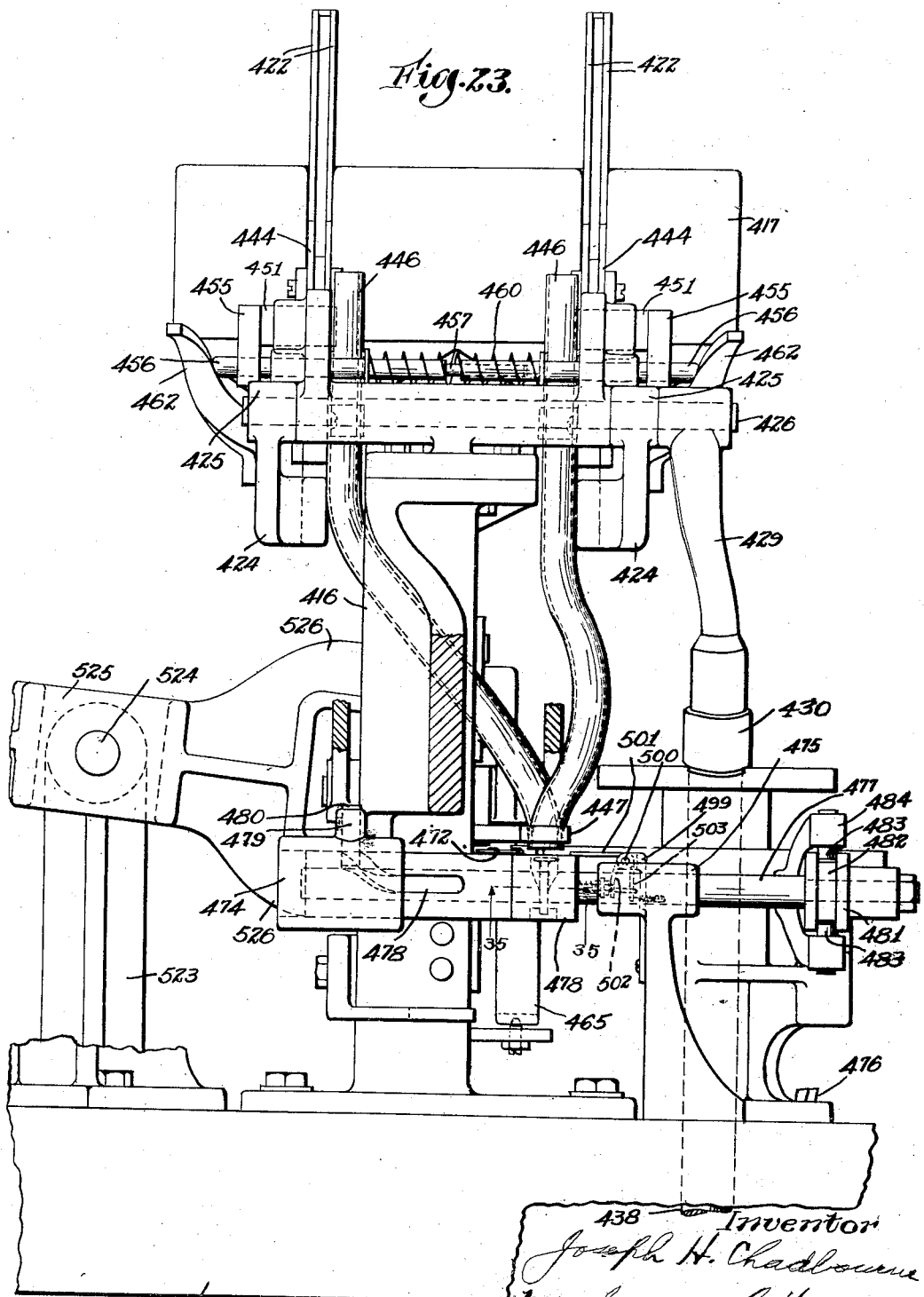

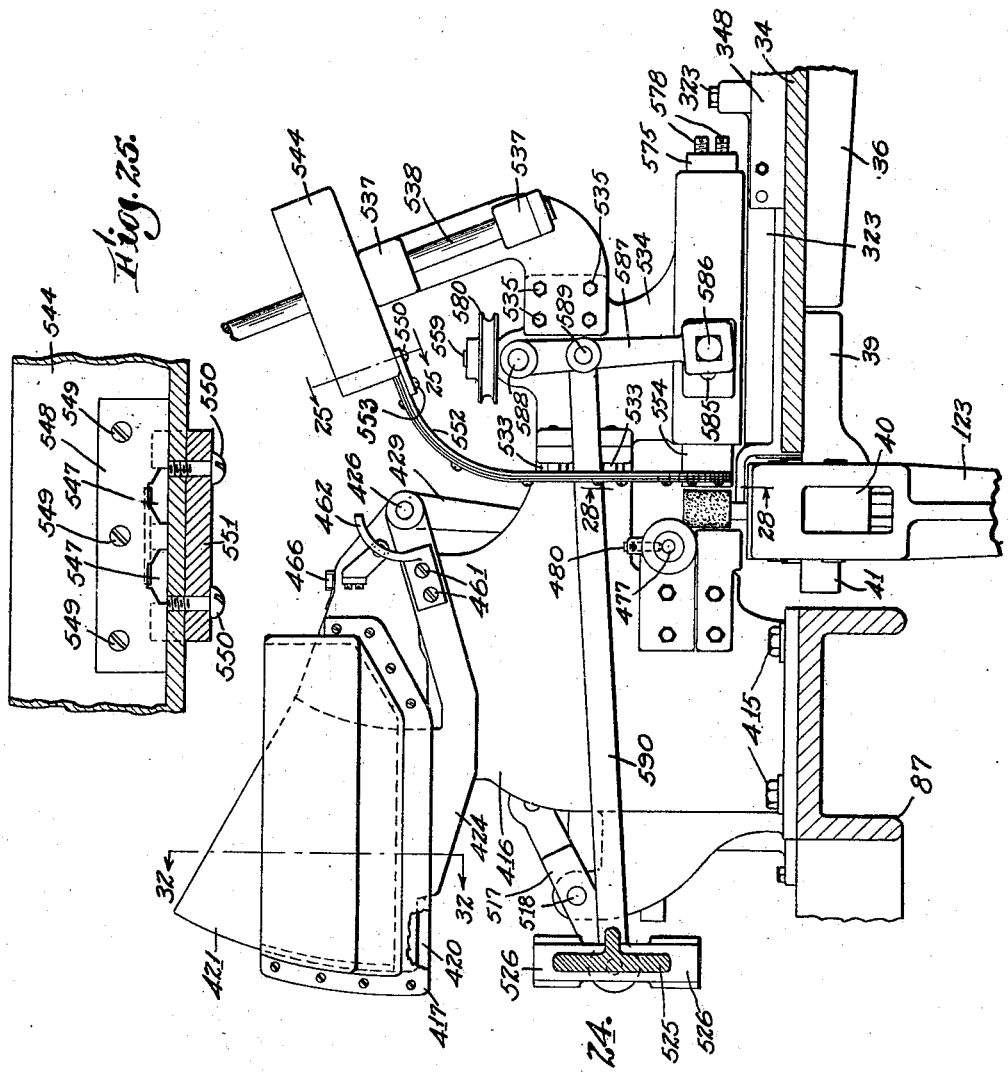

Aug. 19, 1930.　　　J. H. CHADBOURNE　　　1,773,345
MACHINE FOR MANUFACTURING LOOM PICKERS
Filed Jan. 22, 1929　　　23 Sheets-Sheet 14
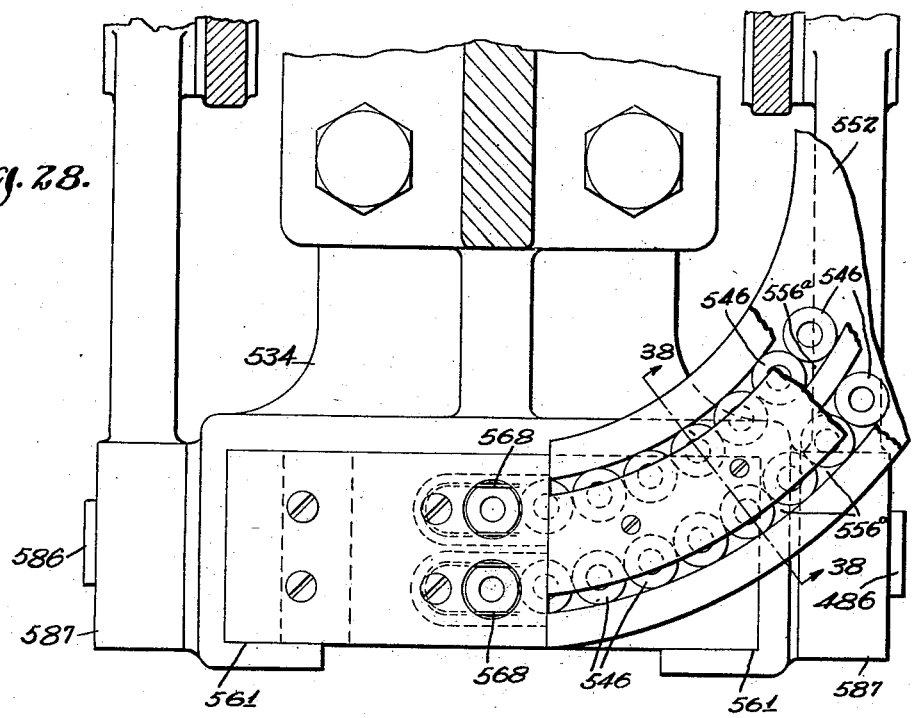
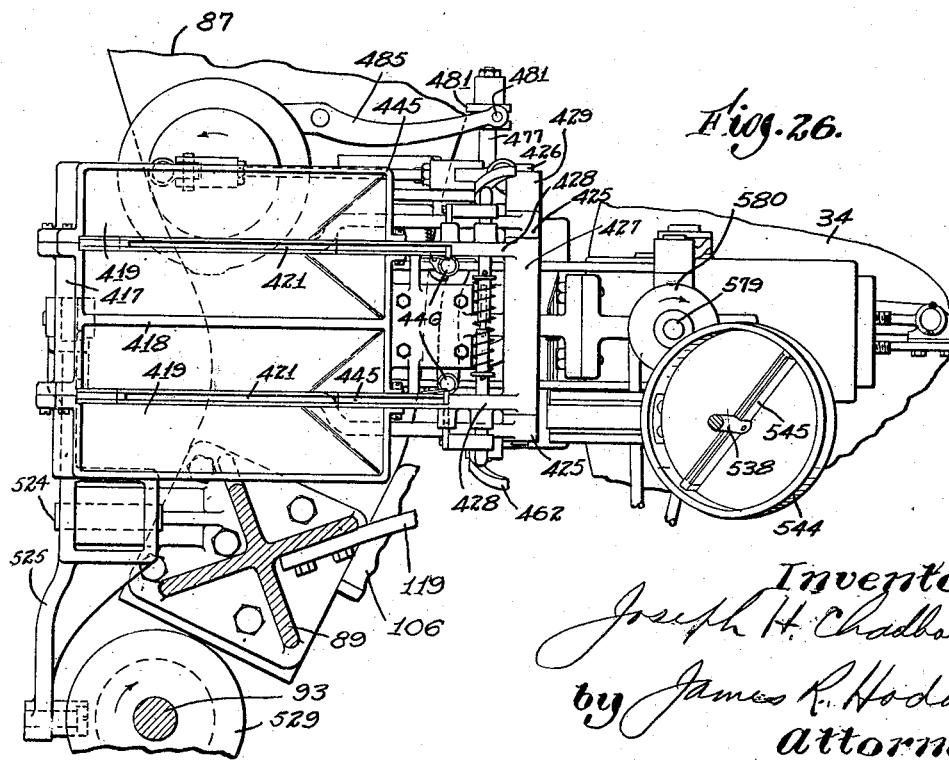

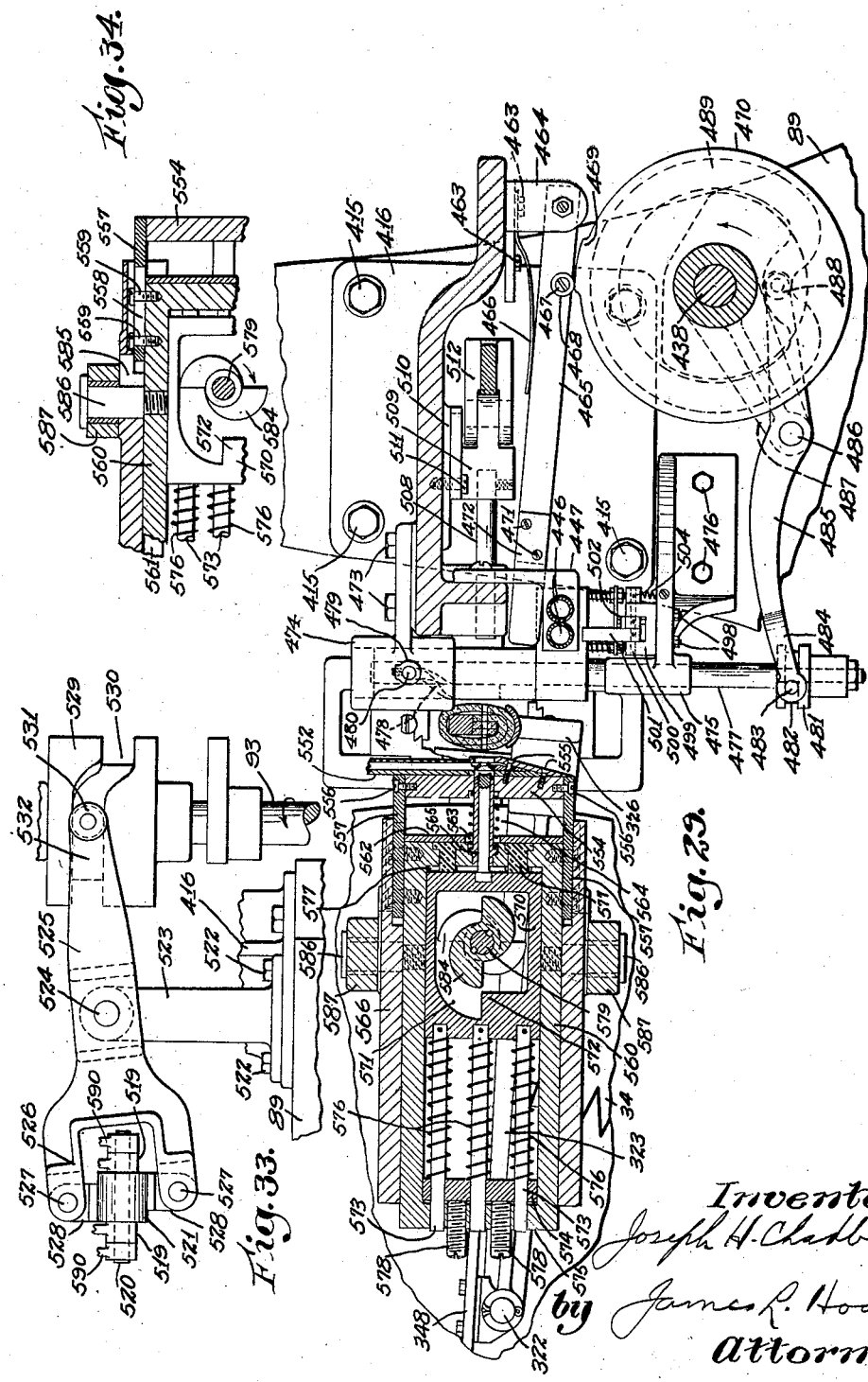

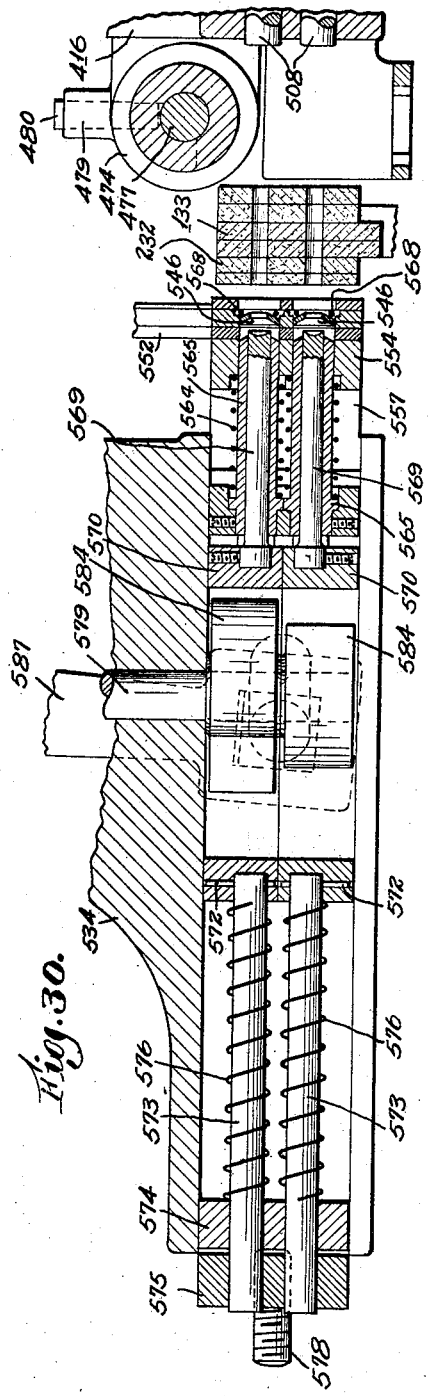

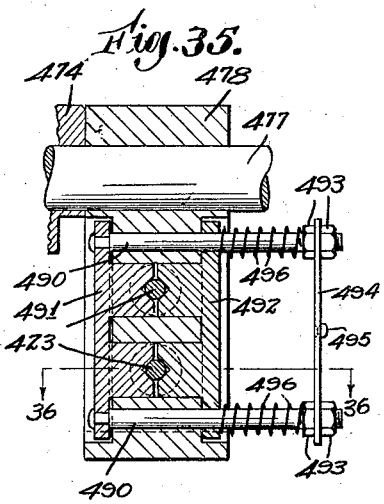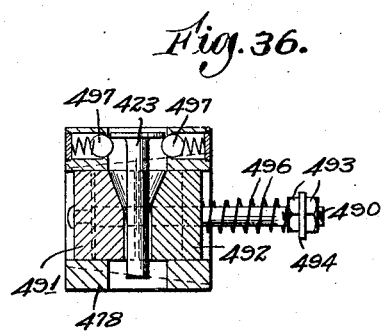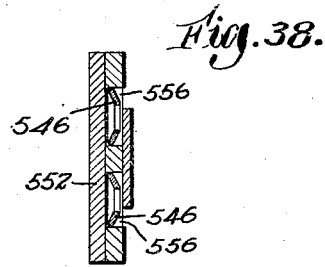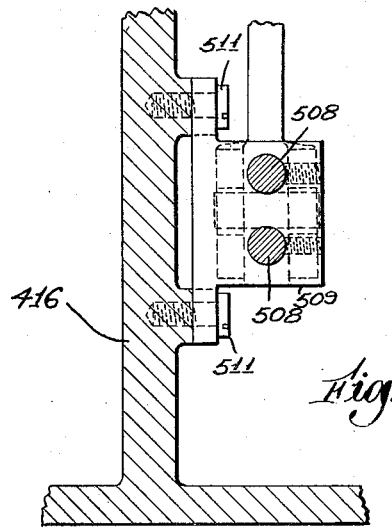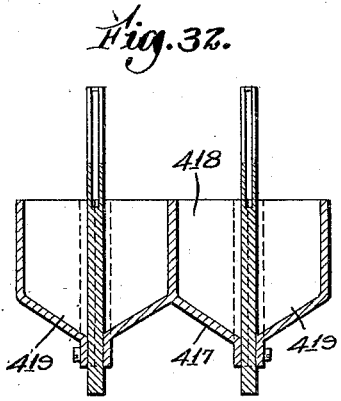

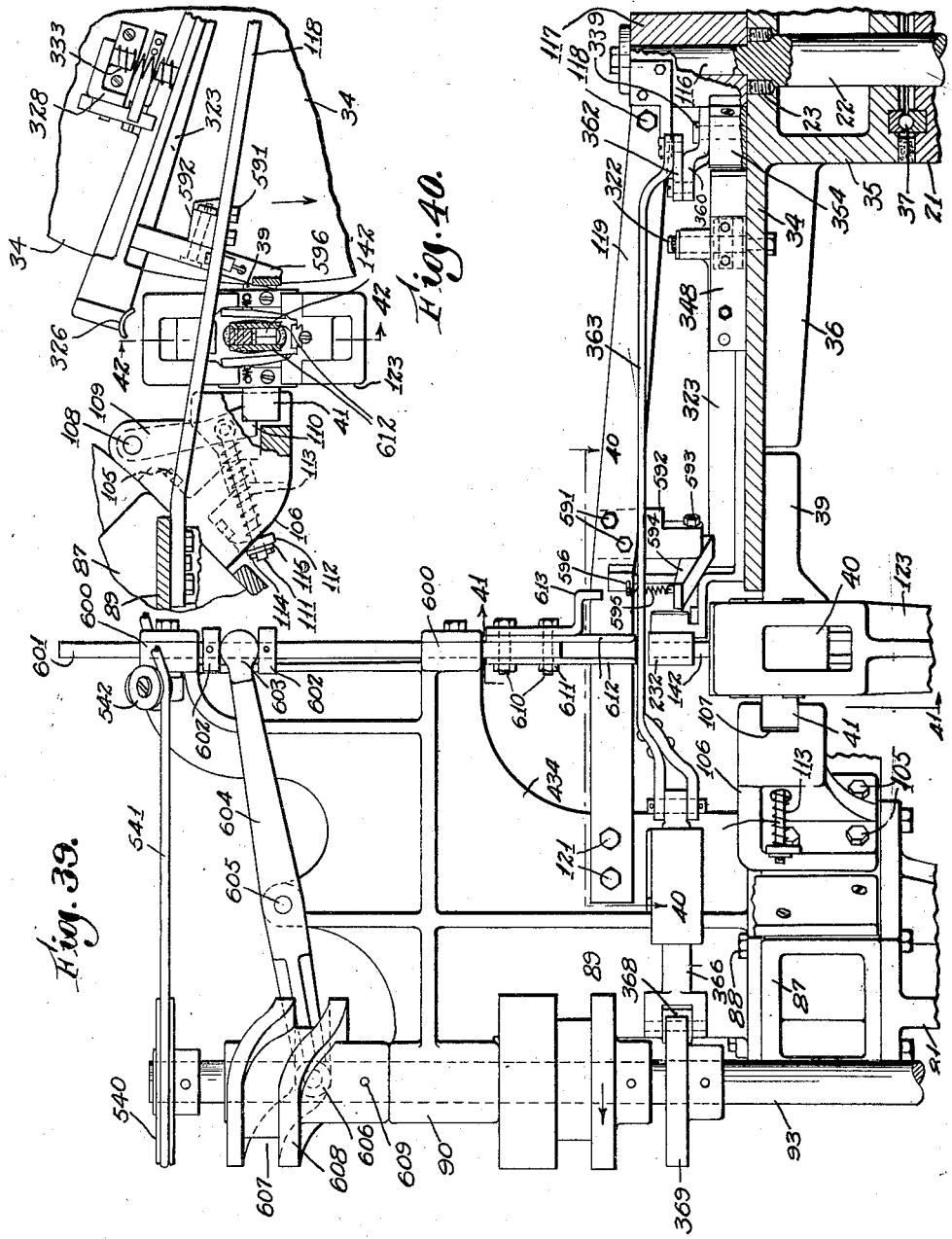

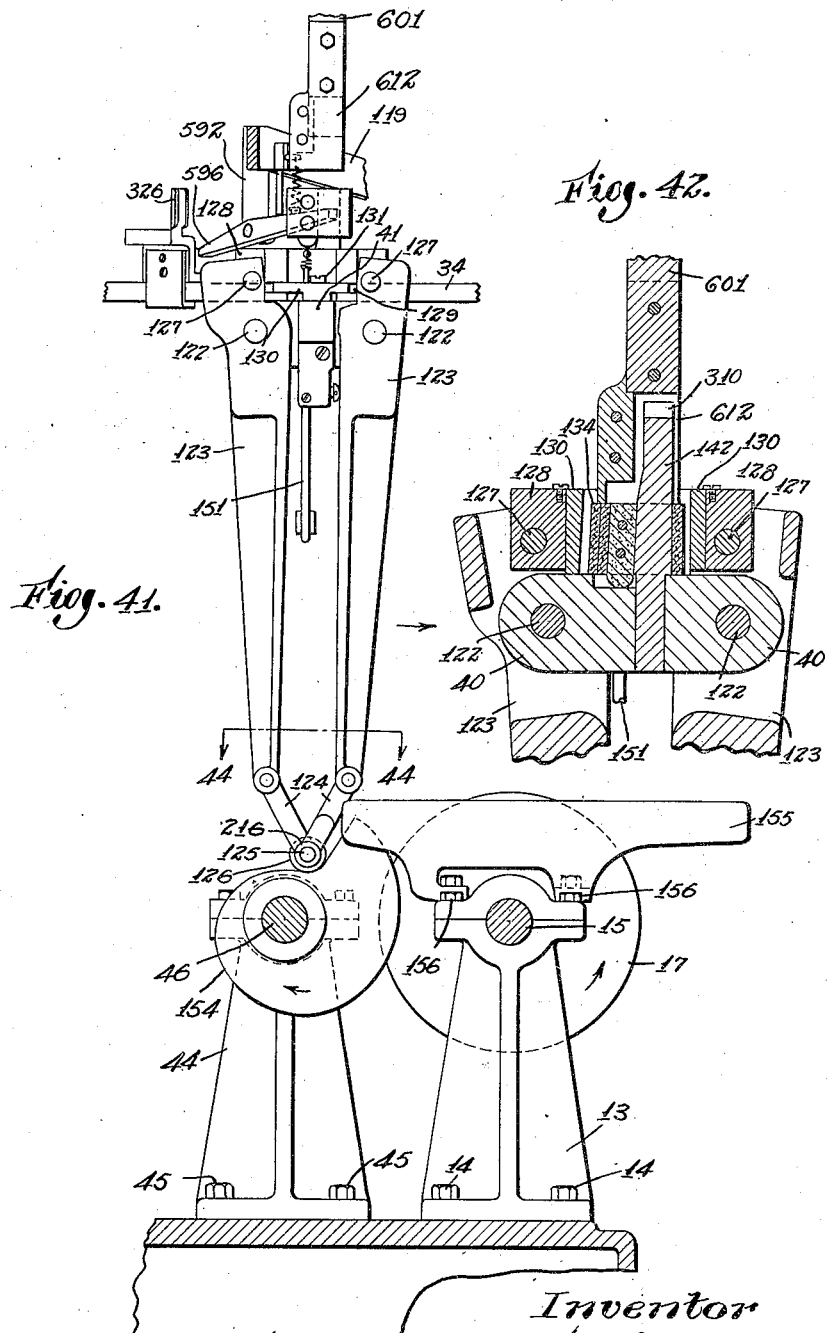

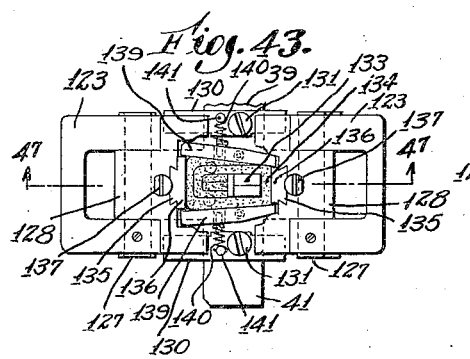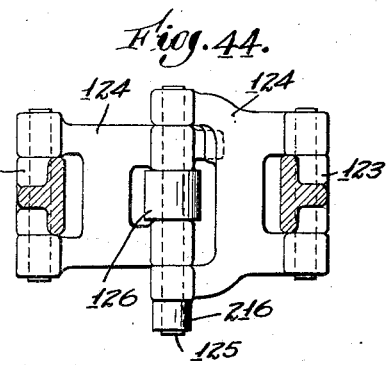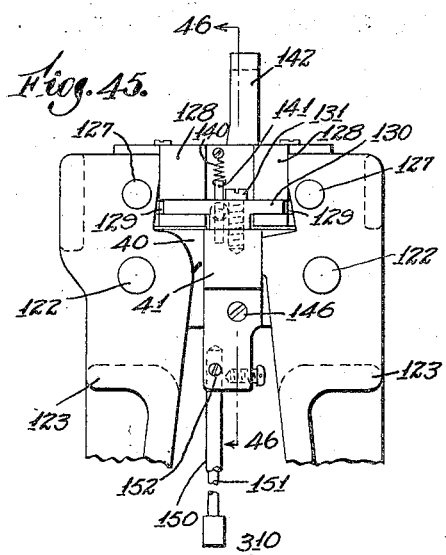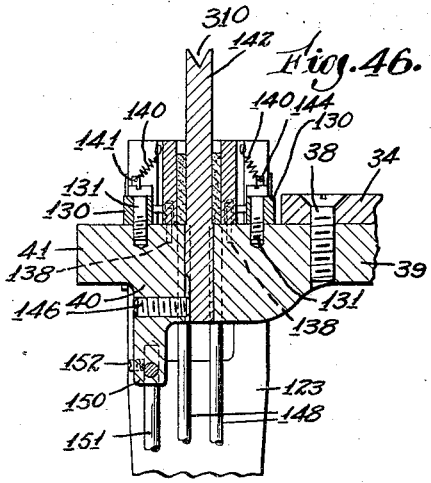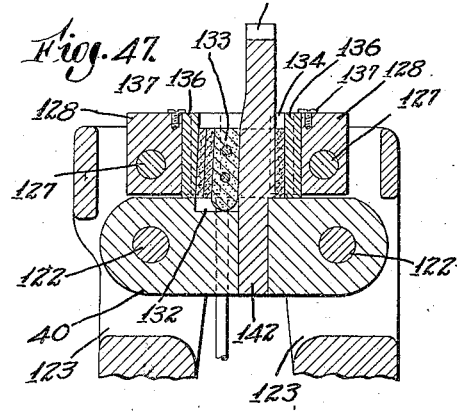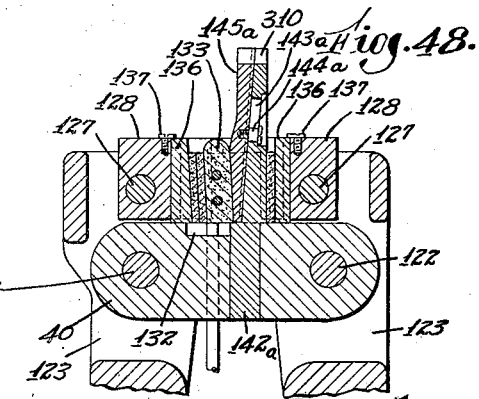

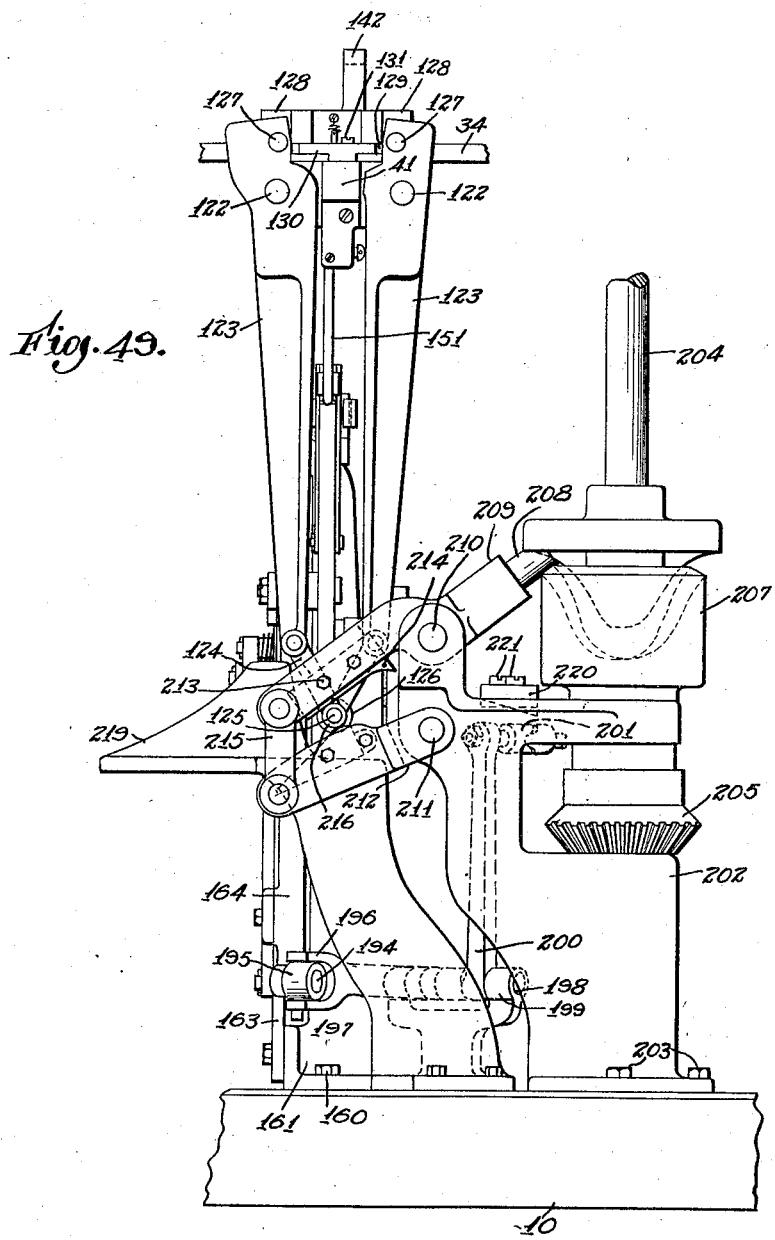

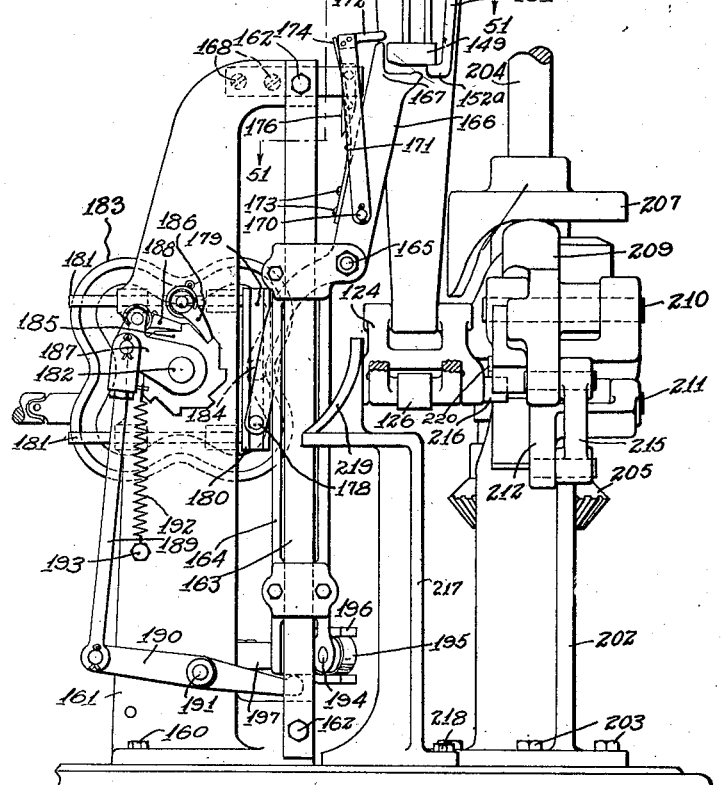

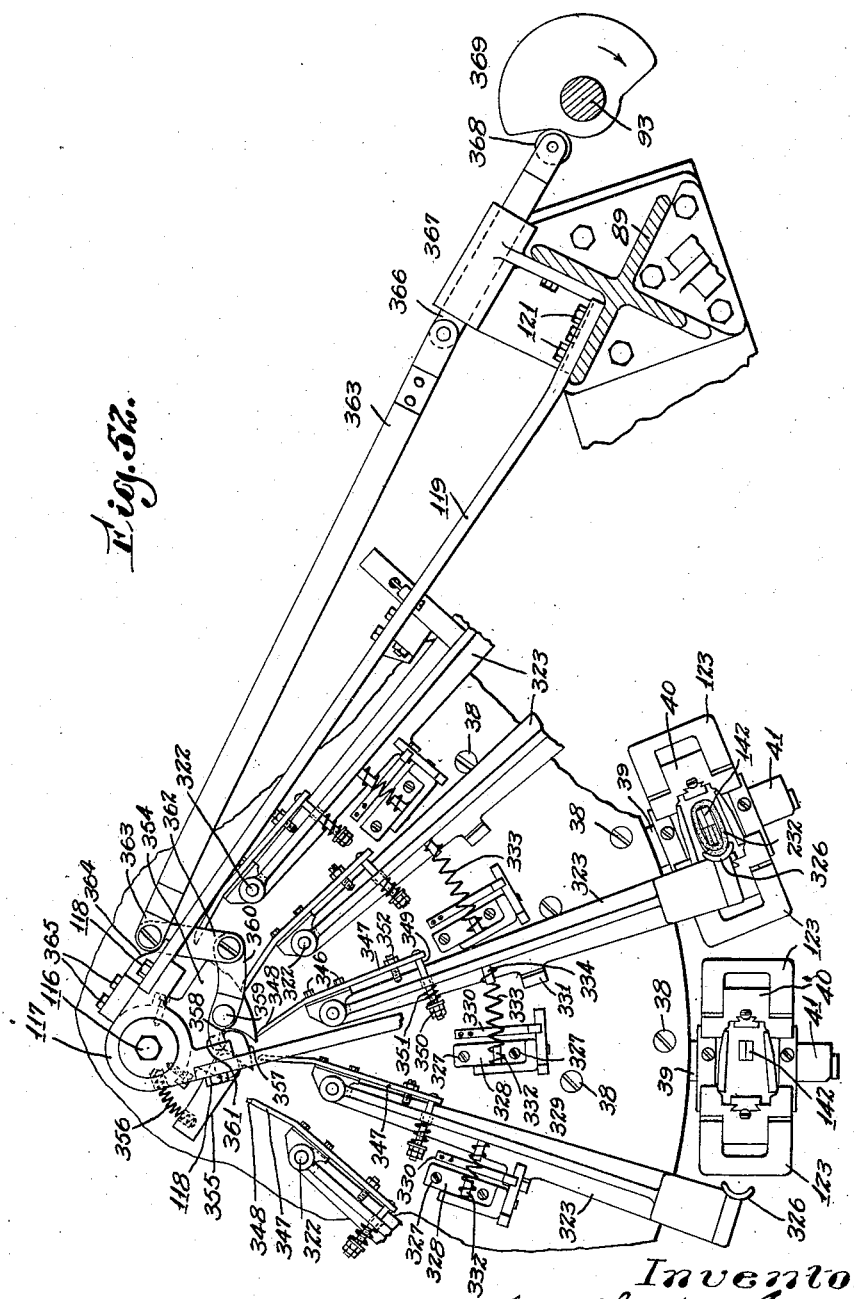

Patented Aug. 19, 1930

1,773,345

UNITED STATES PATENT OFFICE

JOSEPH H. CHADBOURNE, OF DANIELSON, CONNECTICUT, ASSIGNOR TO E. H. JACOBS MANUFACTURING COMPANY, OF DANIELSON, CONNECTICUT, A CORPORATION OF CONNECTICUT

MACHINE FOR MANUFACTURING LOOM PICKERS

Application filed January 22, 1929. Serial No. 334,313.

My present invention relates to textile machinery and more particularly to an improved apparatus for manufacturing picker heads.

Heretofore picker heads for use in textile machinery have been manufactured by hand, the operator taking a strip of tempered leather and manually folding and hammering such strip of leather about a stationary mandril. When in folded and hammered position, a clamp is placed thereon and the picker head in its incompleted condition is set aside and allowed to dry until the leather has obtained a permanent set. The picker head is drilled and rivets passed through the drilled portions and riveted in position. The result has been a picker head that has been passable but not adapted for continuous hard usage. It has been necessary to utilize leather having a large amount of flexibility in order that it may be worked manually and it has been practically impossible to produce a picker head which will hold its shape and size. Further, picker heads manufactured in this manner are relatively expensive.

In my present invention, I have obviated the objections above noted and have produced a machine in which all of the operations necessary to produce a picker head are performed mechanically and automatically and it has been possible to utilize a heavier quality of leather. Such leather being operated on mechanically need not be of as soft a temper as was necessary in the hand manufacture and, therefore, the same will be dried out or obtain a permanent set in a less period of time. Again, the production is speeded up and the cost of manufacture per picker head is relatively low as compared with the cost of hand manufacture. The result is an improved product produced at considerably less expense.

An object of my invention, therefore, is an improved picker head making machine.

Another object of my invention is an improved automatic picker head making machine.

A further object of my invention is an improved machine for automatically and mechanically rolling up a strip of leather of predetermined length on a mandril.

A still further object of my invention is an improved machine for compressing and holding under strain a picker head during the process of manufacture and for a predetermined length of time.

Other objects and novel features comprising the construction and arrangement of parts will appear as the description of the invention progresses.

In the accompanying drawings illustrating a preferred embodiment of my invention, Fig. 1 is an elevation of the whole machine;

Fig. 2 is a plan view of the whole machine;

Fig. 3 is a sectional elevation of the driving mechanism for the rotatable table;

Fig. 4 is a sectional plan view on the line 4—4 of Fig. 3;

Fig. 5 is a plan view partly in section showing the driving arrangement;

Fig. 6 is a sectional elevation on the line 6—6 of Fig. 5;

Fig. 7 is a side elevation of the winding mechanism at station 1 viewed from the left hand side;

Fig. 8 is a side elevation of the upper portion of the winding mechanism viewed from the right hand side;

Fig. 9 is a plan view of the winding mechanism in position 1;

Fig. 10 is a plan view of the winding mechanism in position 2;

Fig. 11 is a plan view of the winding mechanism in position 3;

Fig. 12 is a plan view of the winding mechanism in position 4;

Fig. 13 is a central section of the winding column with the central plunger down and the winding head up;

Fig. 14 is a central section of the winding column with the central plunger down and the winding head down;

Fig. 15 is a side elevation of the column shown in Figs. 13 and 14;

Fig. 16 is a front elevation of the drilling mechanism at station 2;

Fig. 17 is a section on the line 17—17 of Fig. 16;

Fig. 18 is a section on line 18—18 of Fig. 16;

Fig. 19 is a side elevation of the drilling mechanism at station 2;

Fig. 20 is a plan of the drilling mechanism on the line 20—20 of Fig. 19;

Fig. 21 is a section on the line 21—21 of Fig. 19;

Fig. 22 is an elevation of the rivet and washer feeding mechanism viewed from the left hand side;

Fig. 23 is an elevation of the rivet feeding mechanism on the line 23—23 of Fig. 22;

Fig. 24 is an elevation of the rivet and washer feeding mechanism viewed from the right hand side;

Fig. 25 is a section on the line 25—25 of Fig. 24;

Fig. 26 is a plan of the rivet and washer feeding mechanism;

Fig. 27 is a detail of certain mechanism;

Fig. 28 is a section on the line 28—28 of Fig. 24;

Fig. 29 is a sectional plan view on the line 29—29 of Fig. 22 showing the riveting mechanism;

Fig. 30 is a sectional detail of the riveting mechanism in one position thereof;

Fig. 31 is a sectional detail of the riveting mechanism in another position thereof;

Fig. 32 is a sectional detail on the line 32—32 of Fig. 24;

Fig. 33 is an enlarged detail of the elements enclosed in the dot and dash square 33 of Fig. 1;

Fig. 34 is a partial section on the line 34—34 of Fig. 22;

Fig. 35 is a section on the line 35—35 of Fig. 23;

Fig. 36 is a section on the line 36—36 of Fig. 35;

Fig. 37 is a section on the line 37—37 of Fig. 22;

Fig. 38 is a section on the line 38—38 of Fig. 28;

Fig. 39 is an elevation, partly in section, from the right-hand side at the depressing station;

Fig. 40 is a section on the line 40—40 of Fig. 39;

Fig. 41 is a section on the line 41—41 of Fig. 39 and extending down to the base of the machine;

Fig. 42 is a section on the line 42—42 of Fig. 40 and with the plunger in the downward position;

Fig. 43 is a plan view of the clamp;

Fig. 44 is a section on the line 44—44 of Fig. 41;

Fig. 45 is a front elevation of the upper part of the clamp;

Fig. 46 is a section on the line 46—46 of Fig. 45;

Fig. 47 is a section on the line 47—47 of Fig. 43;

Fig. 48 is the same view as Fig. 47 but adapted to hold and manufacture left hand picker heads;

Fig. 49 is a front elevation of the ejecting station;

Fig. 50 is a left hand elevation partly in section of the ejecting station,

Fig. 51 is a section on the line 51—51 of Fig. 50, and

Fig. 52 is a detail plan view of the clamp and pressure device therefor.

Figure 1:
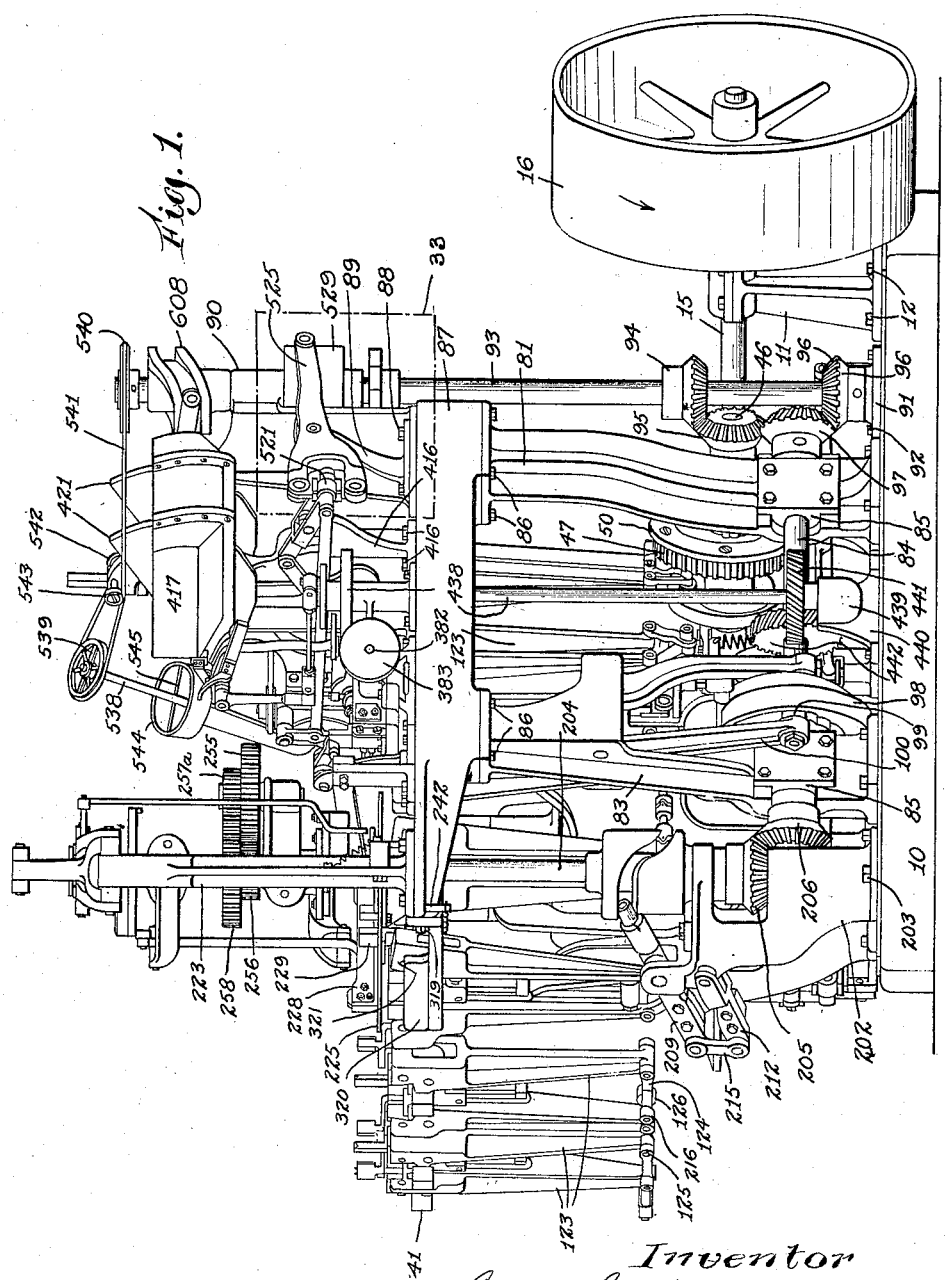

Referring to the drawing, 10 designates a suitable base, to the top of which, adjacent one end, is secured a bearing block 11 by means of bolts 12. Also secured to the top of the base 10 is a bearing block 13 by means of bolts 14, this bearing block being in alinement with the bearing block 11. Rotatably mounted in the bearing blocks 11 and 13 is a main drive shaft 15, to one end of which is secured a pulley 16 and by means of which power may be transmitted to the shaft 15 by any suitable source of power. Secured to the end of the shaft 15, adjacent the bearing block 13, is a crank plate 17. Secured to the top face of the base 10 by bolts 19 is an upright or standard 18 which has formed at its lower and upper ends respectively vertical bearings 20 and 21 respectively and rotatably mounted in such bearings is a vertically arranged shaft 22. Rotatably mounted on the shaft 22 between the bearings 20 and 21 is a driving bracket 23. Secured to the bracket 23 is a shaft 24 provided on its outer end with an enlargement 25, and formed integral with said enlargement 25 and extending radially and outward therefrom and diametrically disposed to each other are stub shafts 26. On the crank plate 17 is secured a stub shaft 27 provided at one end with an enlargement 28, which enlargement has formed integral therewith and extending radially outward therefrom, while diametrically arranged with respect to each other, stub shafts 29. 30 designates a connecting rod provided at one end with a forked member 31 that engages with the stub shaft 26 and at the other end with a forked member 32 which engages with the stub shafts 29. Rotary movement of the main drive shaft 15, therefore, will cause an oscillating movement of the bracket 23, the length of the stroke of such oscillation being determined by the crank pin 27. Secured to the vertically arranged shaft 22 is a circular table or platform 34. Formed integral with the table or platform 34 and on the lower central portion thereof and surrounding the shaft 22 is a hub 35 and connecting the hub 35 and the table 34 at a plurality of points are strengthening ribs 36. Between the lower face of the hub 35 and the upper end of the bearing 21 that is on the standard 18 is a roller bearing 17ᵃ for the purpose of reducing friction between such members. Symmetrically arranged about the periphery of the circular table 34 and secured to the table by screws 38 are radially extending members 39. Formed integrally with the radially extending members 39 and at the end thereof without the peripheral edge of the table 34 and symmetrically disposed with respect to each side of the member 39 is a member 40, such member being perpendicular to the member 39. The purpose of this member 40 will be described in detail hereinafter. Formed integral with the member 40 and in alinement with the member 39 is a locking lug 41. Secured to the base 10 by bolts 42 is a bearing block 43 which is in alinement with a bearing block 44 secured to the base 10 by bolts 45. These bearing blocks 43 and 44 are in alinement with each other and parallel to the shaft 15, and rotatably mounted in the bearing blocks 43 and 44 is a shaft 46. Secured to the shaft 46 is a gear 47 which meshes with and is driven by a gear 48 secured to the main drive shaft 15. The ratio of the gear 48 to the gear 47 is such that the shaft 46 is driven at one-half the speed of the shaft 15 and in the direction of the arrow shown. On the shaft 46 and secured to one end of the gear 47 by screws 49 is a cam 50. Secured to the base 10 beneath the shaft 15 by bolts 51 is a member 52, the upper end of each member being forked as indicated at 53, and in such forked portion is rotatably mounted on shaft 54 a member 55, which member extends at an angle to the shaft 15 and to a point beyond the bearing member 44. Intermediate the ends of the member 55 is a laterally extending stub shaft 56 on which is rotatably mounted a cam roller 57, which cam roller engages with the cam 50 and is operated thereby. The end of the member 55 remote from the shaft 54 is forked as indicated at 58 and this forked end surrounds a collar 59 that is secured to a vertically arranged shaft 60. The shaft 60 is slidably mounted in bearings 61 and 62 respectively that are formed on a bracket 63 that is secured to a base 10 by bolts 64. On the bearings 62 is formed a lug 65 to which is secured the upper end of a coil spring 66, the lower end of this spring being secured to a lug 67 formed on the member 55. The spring 66 tends to pull the forked end of the member 55 upward at all times and, therefore, keeps the cam roller 57 always in engagement with the cam 50. The forked end 58 engaging with the collar 59 always tends, therefore, to move the shaft 60 upward with respect to the base 10. Secured to the upper end of the shaft 60 is a runway or track 68 which is formed practically on an arc of a circle. Formed on the bracket 23 and arranged vertically with respect to the base 10 are guides 69 closed by means of plates 70, which plates are secured to the bracket 23 by bolts 71. Slidably mounted in the guides 69 for vertical movement with respect to the base 10 is a driving bar 72, the upper end of which is adapted to engage with the members 39. Rotatably mounted on a stub shaft 73 at the lower end of the bar 72 is a cam roller 84 that is always in engagement with the upper surface of the track 68. In order to insure that the roll 74 will always engage with the track 68 I have arranged a spring 75, one end of which is attached to the bar 72 and the other to the lower slide member 69. As the shaft 15 rotates, an oscillatory movement of the frame 23 will take place because of the mechanism above described. The shaft 46, however, rotating at but half the speed of the shaft 15 will so rotate the cam 50 as to bring the track 68 upward but once in every second revolution of the shaft 15 and, therefore, the upper end of the driving bar 72 will engage with one of the members 39 at every other oscillation of the frame 23 and this method of operation is for a specific purpose which will be hereinafter described. The members 39 are symmetrically disposed about the periphery of the table 34 and the number of such members 39 may be any desired, due consideration being had for the stroke or oscillatory movement of the bracket 23. The stroke or the oscillation of the bracket 23 is such that the driving bar 72 will rotate the table through a distance equal to the distance between the members 39.

Secured to the base 10 by bolts 80 is a standard or bracket 81 and also secured to the base 10 by bolts 82 is a standard or bracket 83. Bearings 85 are formed in such standards and these bearings are in alinement with each other, and rotatably mounted in such bearings is a shaft 84. Secured to the top of the standards 81 and 83 by bolts 86 is a platform 87. Secured to the top of the platform 87 adjacent one end thereof by bolts 88 is a frame or bracket 89. Formed on the frame or bracket 89 is a bearing 90 which is in alinement with a step bearing 91 secured to the base 10 by bolts 92 and in the bearings 90 and 91 is rotatably mounted a vertically arranged shaft 93. Intermediate the ends of the shaft 93 is secured a bevel pinion 94 which meshes with and is driven by a bevel pinion 95 secured to one end of the shaft 46. Secured to the shaft 93 adjacent to the step bearing 91 is a bevel pinion 96 which meshes with and drives a bevel pinion 97 secured to one end of the shaft 84. The bevel pinions 94, 95, 96 and 97 are all equal in diameter and pitch and, therefore, the shaft 84 is rotated at the same speed as the shaft 46, that is, at one-half the speed of the main drive shaft 15. Secured to the shaft 84 adjacent to the bearing 85 is a cam 98 with which engages a cam roller 99 that is rotatably mounted on the lower end of a locking lever 100, that is pivotally mounted at 101 on the bracket or standard 83. Formed in the platform 87 is a slideway 102 which acts as a guide for a locking head 103 formed on the upper end of the locking lever 100. In the locking head 103 is formed a recess 104 in which fits the locking lug 41 above described as being formed integral with the cross member 40 and on the members 39. The throw of the cam 98 is so adjusted with respect to the throw of the cam 50 that when the operating bar 72 moves upward to engage with one or the other of the members 39, the cam 98 will have rotated the locking lever 100 about the pivot 101 so as to move the locking head 103 out of engagement with the locking lug 41 and permit the operating bar 72 to rotate the table 34 in the proper direction and to the proper distance, as determined by the throw of the connecting rod 30.

Secured to the platform 87 by bolts 105 is a bracket 106, such bracket being formed with the horizontal slideway 107 through which the locking lugs 41 on the members 39 may slide during the rotation of the table 34. Pivotally mounted on a shaft 108 secured in the bracket 106 is a latch 109. The forward end of this latch is recessed at 110 to engage with the rear end of the locking lugs 41. Pivotally attached to the latch 109 adjacent to the portion 110 is one end of a rod 111, which rod is slidably mounted in a lug 112 formed integral with the bracket 106. Between the lug 112 and the latch 109 and surrounding the rod 111 is a coil spring 113, while secured to the end of the lug 112 on the side remote from the spring 113 by cotter pin 114 is a washer 115. The spring 113 constantly urges the latch 109 in a counter-clockwise rotary movement about the shaft 108 and the spring 113 is compressed by the locking lug 41 engaging with the recessed end 110 of such latch. The latch 109 co-operates with the locking head 103 in that the latch 109 prevents retrograde movement of the table 34 as it is rotated by the bar 72.

The shaft 22 extends above the table 34 and this extended portion is reduced in diameter as indicated at 116. This reduced portion rotates in a bearing 117, which bearing has secured thereto, by bolts 118, straps 119 and 120. Such straps 119 and 120 extend toward the bracket or frame 89 at an angle to each other and are secured to such frame or bracket by bolts 121. This construction strengthens the mounting for the table 34.

As above described, the member 40 formed integral with the member 39 extends laterally outward on each side of such member 39 and the ends of the extension 40 on each side of the member 39 are drilled to receive bearing shafts 122. The bearing shafts 122 extend laterally outward on each side of the ends of the member 40 and on each shaft 122 is pivotally mounted the upper end of a depending leg 123, there thus being one pair of legs 123 for each of the members 40. To the lower end of each of the legs 123 is pivotally attached one end of the link 124, the other ends of such links being pivotally mounted on a shaft 125, which shaft is common to the pair of links 124. Also on the shaft 123 is rotatably mounted a cam roller 126. The links 124 act as a pair of toggle levers to hold the lower ends of the legs 123 in their outermost position. Above the member 40 in the legs 123 and parallelly arranged with respect to each other and to the shafts 122 are shafts 127 and on each of these shafts is pivotally mounted a block 128 and these blocks are spaced apart from each other, as clearly shown in Figs. 43, 47 and 48. The blocks 128 are provided on each side with horizontal grooves 129, the grooves being in alinement with each other and in each of the grooves 129 on one side of the blocks 128 is arranged a bar 130. The blocks 128, therefore, slide on the blocks 130 and the blocks 130 are secured to the upper face of the member 40 by screws 131. The block 40 is recessed on its upper face, as indicated at 132, to receive the tail piece 133 of the picker head 134 that is to be manufactured with the machine. The blocks 128 are spaced apart from each other and their opposing faces are dove-tailed vertically to receive the dove-tailed portion 135 of jaws 136, such jaws being held in position on the blocks 128 by screws 137. Secured in the block 40 and extending upward from the upper face thereof in the space between the blocks 128 are pins 138 and rotatably mounted on such pins and resting on the top face of the block 40 are plates 139. Secured to the outer face of the blocks 139 is one end of coiled springs 140, the other end of such spring being attached to a pin 141 on the member 130. The jaws 136 and blocks 139, together with the top face of the block 40 define a substantially rectangular box in which the picker head 134 may be placed. The block 40 has secured therein and extending upwardly therefrom a mandril 142. The shape of this mandril varies with the type of picker head 134 being manufactured, that type of mandril shown in Figs. 45, 46, 47 being utilized when one form of picker head is being manufactured, while that shown in Fig. 48 is utilized when another form is manufactured. In the mandril shown in Fig. 48 the portion 142$^a$ is slotted as indicated at 143$^a$ and through the slotted portion passes a holding screw 144$^a$ for holding an auxiliary member 145 in position therein and to engage with the tail piece 133. The mandril 142 is removably held in position in the block 40 by means of a screw 146. The block 40 is provided with two vertically arranged holes 147, in which holes are slidably mounted the ejecting rods 148, such ejecting rods being secured at their lower ends to a block 149. The block 40 is provided with a downwardly extending lug 150 drilled to receive the upper end of a downwardly extending member 151, such member being held in position by a screw 152. The lower end of the member 151 is provided with a hooked portion 152$^a$ which engages with the lower end of the block 149 and prevents too far a downward movement of the ejecting rods 148. If the picker head 134, while in the process of manufacture, is in the hollow open-ended box formed by the jaws 136, the plates 139 and the top face of the block 40, as shown in Fig. 42, and the block 40 with which the picker head is associated, is moved with the table 34, a compressing action on the picker 134 will take place, due to the following apparatus. On the shaft 46 above described and adjacent to the bearing block 48, is a cam 154 which rotates in the direction of the arrow shown in Fig. 41 and when the pair of legs 123 associated with the block 40 on which the picker 134 is mounted come into the position shown in such Fig. 41, a rotary movement of the cam 154 will, through the cam roller 126 and links 124, move the lower ends of the legs 123 outwardly. The cam 154 is so arranged as to bring the center of the cam shaft 125 above a line joining the two pivot connections of the upper ends of the links 124, or in a position to not only lock the legs 123 in their outward position but to bring the cam roller 126 slightly above the upper surface of a track 155, which track is secured by bolts 156 to the bearing block 13. The cam track 155 is not necessary when a block 40 and the parts associated therewith have associated with them a picker head 134 in the process of manufacture. As however it may not always be possible to keep up the machine in building the picker heads, it may happen that the block 40 with its associated parts does not have associated with them a picker head 134 and, therefore, although the cam 154 will move the links 124 upward into the position above described, yet when the legs 123 have passed the cam 154, the weight thereof will allow the same to drop down into their original position or into the position now occupied in Fig. 41 and a possible derangement of the apparatus may result. The cam track prevents this, however, and therefore the cam track 155 is in the nature of a safety device.

The table 134 will, when power is turned into the mechanism, through the shaft 15, rotate in the direction of the arrow shown, for example, in Fig. 2 step-by-step, and in order to prepare the blocks 40 and the mechanism associated therewith for the reception of material for forming a picker head 134, the ejecting operating means, of which the ejecting rods 148 form a part, is provided. Secured to the base 10 by bolts 160 is a standard 161. Secured to the standard 161 by bolts 162 is a vertically arranged bar 163. Slidably mounted on such bar 163 is a member 164, to the upper end of which is pivotally mounted at 165 an operating lever 166. The upper end of this operating lever 166 is provided with a hook portion 167 that is adapted to engage with the lower end of the block 149 to which the ejecting rods 148 are attached. Secured to the top end of the standard 161 by screws 168 is a bar or strap 169, which bar or strap extends outward from the standard 161 toward the forked end 167 of the operating lever 166. Pivotally mounted at 170 on the operating lever 166 and extending upwardly therefrom is a frame 171, to the top end of which is secured, by riveting or in any other suitable manner, a laterally extending plate 172 that is adapted under certain circumstances to engage with the top face of the block 149. Secured to the operating lever 166 by screws 173 is a spring 174. This spring extends upwardly from the screws 173 and this free end engages with the rear of the plate 172 and constantly urges the frame 171 in a clockwise direction about the pivot point 170. Secured to the frame 171 by screws 175 is a cam 176, which cam engages and is operated by an angular portion 177 of the bar 169. If we assume the parts above described to be in the position shown in Fig. 50, then it will be obvious that as the member 164 moves upwardly on the stationary slide bar 163 that the forked end 167 of the operating lever 166 will engage with the lower face of the block 149 and will move such block upwardly, carrying the ejecting rods 148 therewith. In the upward movement of the operating lever 166 the frame 171 is carried therewith and the cam 176, riding over the end 177 of the bar 169, will allow the spring 174 to force the laterally extending plate 172 into position above the block 149 so that on the downward movement of such operating lever 166, the block 149 and the associated ejecting rods 148 will be moved downwardly out of the operative position and back into the normal or inoperative position, as shown in Fig. 50. The operating lever 166 extends downwardly beyond the pivot point 165 and at the lower end of the operating lever is secured a cam pin 178. This cam pin works in a slide 179 formed in the member 180 and this member is secured to two parallelly arranged rods 181. The rods 181 are slidably mounted in suitable bearings in the standard 161. Rotatably mounted in the standard 161 in suitable bearings is a shaft 182 and secured to said shaft at one end thereof and on one side of the standard 161 is a cam 183. Secured to the rear face of the slide 179 is a cam roller 184, which fits into the cam race of the cam 183. It is obvious, therefore, that rotation of the cam plate 183 will cause an inward and outward movement of the member 180 with respect to the standard 161 and, therefore, will cause a rotative movement of the operating lever 166 about its pivot 165 so as to bring the forked end 167 of such operating lever either into operative position with respect to the block 149, as shown in Fig. 50, or into such position that upward movement of the member 164 will have no effect on the block 149. Secured to the shaft 182 on the side of the standard 161 opposite the cam plate 183 is a ratchet 185 with which is associated a locking pawl 186 which prevents retrograde movement of the shaft 182. The shaft 182 is, therefore, constrained to rotate in one direction only, namely a clockwise direction as viewed in Fig. 50. Rotatably mounted on the shaft 182 is a crank arm 187 with which is associated a driving pawl 188. Pivotally attached to the arm 187 is the upper end of a connecting rod 189 and the lower end of this connecting rod is pivotally attached to one end of a lever 190, which lever is pivotally mounted at 191 on the standard 161. The pivot point 191 of the lever 190 is intermediate the ends of such lever and the end of such lever remote from the point of connection of the connecting rod 189 engages with the lower end of the member 164. Secured to the connecting rod 189 adjacent the upper end thereof is one end of a coil spring 192, and the lower end of this coil spring is fastened to the standard 161 by bolt 193. The spring 191 tends constantly to urge the connecting rod 189 downwardly or in such a position as to bring the driving pawl 188 into a new operating position and to have the end of the lever 190 move upwardly with the member 164. The member 164 is positively driven, as will be hereinafter described, and the downward movement thereof will act as a drive for the driving pawl 188 to rotate the shaft 182 in a clockwise direction and by a step-by-step movement. Secured to the lower end of the member 164 is a shaft 194, on which is rotatably mounted a roller 195. This roller 195 is engaged in the forked end 196 of an arm 197 secured to the shaft 198, this shaft being rotatably mounted in suitable bearings 199 formed on the standard 161. Secured to the shaft 198 is the lower end of a lever 200 and to the upper end of this lever is attached one end of a shaft 201 that is composed of a plurality of universal joints. The other end of this shaft 201 is attached to the frame 23.

As has been described above, the frame 23 makes a complete oscillation on the shaft 22 for every revolution of the main drive shaft 15, but the table 34 is only given a rotative movement once in every other revolution of the main drive shaft 15. The ejecting mechanism just described is so timed as to operate and move the ejecting rods 148 only during the time that the table 34 is at rest. In order to insure that the blocks 136 and plates 139 are in correct position to have a picker head 134 manufactured thereon, it is necessary to provide means for so operating on the legs 123 as to place such blocks 136 and plates 139 in the correct position. To insure this operation I have provided a standard 202 secured to the base 10 by bolts 203 and in this standard provide suitable bearings to rotatably support a vertically arranged shaft 204. Secured to the shaft 204 adjacent its lower end is a bevelled pinion 205 which meshes with and is driven by a bevelled pinion 206 secured to the end of the shaft 84 adjacent the standard 83. Secured to the shaft 204 is a cam 207 which engages with a cam roller 208 fixed to one end of a lever 209 that is pivoted intermediate its ends to a shaft 210 in the standard 202. Also pivoted on a shaft 211 in the standard 202 is one end of a cam link 212 which co-operates with one end of the lever 209, which end also operates as a cam member. Secured to this end of the lever 209 by bolts 213 is a cam plate 214. The outer ends of the lever 209 and cam plate 212 are pivotally connected together by a link 215. The cam plate 214 and the opposing edge of the cam 212 are adapted to engage with a roller 216 mounted on one end of the shaft 125 that forms the pivotal connection of the links 124 associated with the pair of legs 123. The cam race formed by the cam plate 214 and the cam face of the cam link 212 are adapted to engage with the roller 216 when the links 124 are in their uppermost or locking position, and the rotation of the shaft 204 causes the cam 207 to move the cam lever 209 about the shaft 210 in a counter-clockwise direction, or into the position shown in Fig. 49, where it will be apparent that the links 124 are in their lowermost position and the jaws 128 are in their outermost position. As it may happen that the pair of legs 123 and their associated block 40 have not had a picker head 134 formed thereon, the pair of links 124 associated with such legs 123 will drop into the lowermost position after the table 34 has rotated a sufficient distance to bring such unloaded legs 123 and the links 124 associated therewith out of engagement with the cam track 155. When this happens, the roller 216 on the shaft 125 will not be in position to be engaged by the cam plate 210 and as it is necessary that such roller 216 be engaged by such element in order to prevent derangement of the apparatus I have provided a standard 217 secured to the base 10 by bolts 218, which standard has formed thereon a cam 219, which cam will engage with one of the links 124 and cause the links to move into their uppermost position or into the position where the roll 216 thereon will be engaged by the cam plate 214. In order to further insure that the legs 123 are in the proper position, I have arranged a cam plate 220 at the delivery end of the cam plate 214, such cam 220 being secured to the pedestal 202 by screws 221.

After passing through the mechanism shown in Fig. 49, the block 40, with its associated mechanism, including the legs 128, will move into association with the winding or forming mechanism. Secured to the member 87 by screws 222 is a framework 223 in which is formed bearings 224 and 225 in alignment with each other and in which is rotatably mounted the upper end of the shaft 204. Secured to the framework 223 is a plate or platform 225ª having one of its edges cut in a curve 226 that is concentric with the periphery of the table 34 although spaced apart therefrom. Rotatably mounted in the plate 225 is a shaft 227, to which is secured a quadrant-shaped member 228, secured to the upper face of the platform 225 is a lug 229 which limits the counter clockwise movement of the quadrant 228, as will be clearly seen in Figs. 9, 10, 11, and 12. Secured to the peripheral edge of the quadrant 228 by bolts 230 is a member 231 spaced apart from the quadrant 228 so as to provide an arcuate groove 231ª for the reception of a strip of leather 232 of which the picker head is to be composed. Secured to the quadrant 228 and to the spaced element 231 are spring clips 233 and 234 respectively, such spring members forming a chamber and acting as a spring-holding means for the tail piece 235 and the filler pieces 236 of the picker head to be manufactured. In the platform 225 is formed an arcuate groove 237 in which the outer peripheral edge of the quadrant 228 is guided about the shaft 227 as a center. Secured to the lower end of the shaft 227 is a lever 239, to which, and intermediate the ends thereof, is secured a pin 240. Secured to such pin 240 is one end of a coil spring 241, the other end of this spring being secured to a pin 242 secured to the frame member 87. Slidably mounted in the outer end of the lever 239 is a driving pin 243. The driving pin 243 is yieldingly held in its uppermost position by a spring 244, one end of which is secured to the pin 243 and the other end to the lever 239 by bolt 245. The lower end of the driving pin 243 is extended at right angles to the main body thereof, as indicated at 246 for a purpose to be hereinafter described. The upper end of the driving pin 243 is normally in the path of movement of the lugs 41 carried by the members 39 and, therefore, the table 34 and attached parts act as a driving means for rotating the quadrant 228 about the shaft 227 as a center and insures that the quadrant 228 will move in synchronism with the table 34. Secured to the framework 223 is a plate or table 248, which, as will be clearly seen in Figs. 9 to 12 inclusive, is spaced apart from the curved portion 226 of the table 225 and forms, with such curved portion 226, a curved path or guideway 249 in which the mandril 133 carried by the member 40 is guided. Also, it forms a guideway for a clamping device 250 which will be hereinafter described. Formed in the framework 223 are alined bearings 251, in which bearings is rotatably and slidably mounted a tubular member 252. Between the bearing members 251 and on the sleeve 252 is mounted a sleeve 253. The sleeve 252 rotates with but is slidable on the sleeve 253, this being made possible by means of the key 254, as clearly shown in Fig. 13. Secured to the sleeve 253 is a pinion 255 which meshes with and is driven by an idler gear 256 rotatably mounted on a stub shaft 257 secured to the framework 223. Also mounted on the stub shaft 257 and secured to the gear 256 is a pinion 257ª which meshes with and is driven by a gear 258 secured to the vertical shaft 204. Secured to the upper end of the sleeve 252 is a sleeve 259 provided with an annular concentrically arranged groove 260 in which fits the forked end 261 of a lever 262, such forked end 261 being provided with rolls 263 which are in actual engagement with the upper and lower surfaces of the annular groove 260. Formed as an integral part of the framework 223 and extending laterally and upwardly therefrom is an arm 264 in which is secured a shaft 265 and on this shaft is rotatably mounted the lever 262. Formed integral with the lever 262 intermediate its ends and extending downwardly therefrom, as viewed in Fig. 7, is a member 266, which has secured thereto and extending laterally therefrom, a shaft 267. On this shaft is rotatably mounted a cam roller 268 which engages with a cam 269 formed on a cam plate 270 that is secured to the upper end of the shaft 204. Secured to a pin 271 on the lever 262 is one end of a spring 272, the other end of this spring being secured to the arm 264, and such spring always tends to hold the cam roller 268 in engagement with the cam 269 and, therefore, constantly urges the sleeve 252 downwardly. Secured to the framework 223 and extending laterally outward therefrom is a stub shaft 273 and rotatably mounted on this shaft 273 is an operating lever 274. This operating lever extends downwardly and into association with the laterally extending portion 246 of the slidably mounted operating pin in the lever 239. Secured to the lever 274 is one end of a coil spring 275, the other end of this spring being secured by screw 276 to the framework 223 and this spring tends to raise the free end of the lever 274 upward about the shaft 273 and out of engagement with the member 246. Formed integral with and extending laterally outward from the lever 274 is a ledge or shelf 277 adapted to be engaged by the lower end of a rod 278 that is pivotally mounted at its upper end to a shaft 279 extending laterally outward from the lever 262. The rod 278 passes through a bearing 279 secured to the framework 223 and is loosely mounted for vertical movement therein. On rotation of the shaft 204 with the consequent rotation of the cam plate 270, the cam 269 will allow the spring 272 to force the outer end of the lever 262 downward, carrying the sleeve 252 therewith and also carrying downward the rod 278. This will occur at the proper time in the sequence of operations of the machine, as will be hereinafter explained in detail to bring the end of the lever 274 into engagement with the member 246 on the operating pin 243 and move such operating pin 243 out of engagement with the lug 41 carried by the member 40, whereupon the spring 241 will return the quadrant 248 to its initial position, as shown for example in Figs. 9, 11 and 12. Secured to the lower end of the tubular member 252 is a member 282, on the upper face of which is adjustably secured, by bolts 281, a member 280. The adjustment of the member 280 is made possible by the arcuate slots 283 formed in the member 280, as clearly shown in Fig. 9. Secured to the member 282 adjacent one end thereof are shafts 284 and on such shafts are pivotally mounted members 285. Each of the members 285 is composed of an angular structure having two arms 286 and 287 and on the end of the arm 286 is formed a rubbing or holding element 288, and on the other arm 287 is rotatably mounted a cam roller 289. Formed on the member 280 on the peripheral edge thereof and diametrically arranged with respect to each other are cam surfaces 290 with which the cam rollers 289 engage. To the arms 287 are attached the ends of the coil spring 291, which spring tends always to bring the rubbing pieces 288 and cam rollers 289 toward each other, as clearly shown in Fig. 12, and the closeness of approach of the rubbing elements 288 is determined by the cam surfaces 290.

Pivotally mounted on the shaft 265 and extending above and substantially parallel to the lever 262 is a lever 293. Pivotally attached to the outer free end of the lever 293 is the upper end of a rod or shaft 294, which extends downwardly within the tubular member 252. Slidably mounted on the member 294 is a tubular member 295, the amount of movement of the members 294 and 295 being limited by a pin 296 extending through the member 294 and working in slots 297 in the tubular member 295. At the bottom of the tubular member 295 is riveted a member 298 and between the upper end of the member 298 and the lower end of the member 294 is located a spring 299 which tends to force the member 294 into its uppermost position with relation to the tubular member 295. Removably secured to the lower end of the member 298 by pins 300 and located on either side of the member 298 are downwardly extending plates 301. Secured to the inner faces of the downwardly extending plates 301 and of a length to leave a clear space below the same and within the limits of the plates 301 are spacing plates 302, while on the outside face of the plates 301 are secured downwardly extending spring plates 303. Adjacent the lower end of the plates 301 are alined perforations in which is loosely fitted a pin 304, the outer ends of the pins 304 abutting against the inner lower face of the plates 303 and between the inner faces of the lower end of the plates 301 is located a spring 305 which tends to force the outer ends of the plates 301 outwardly, as will be clearly seen in Figs. 13 and 14. Secured to the lower end of the inner faces of the plates 301 by screws 306 are plates 307, the lower ends of which are bevelled as indicated at 308, and between such plates 307 and the lower end of the plates 301 are spring holding plates 309. The normal distance between the spring holding plates 309 is such that the plates 309 may be located on either side of the pile-up composed of the strip of leather 232 and the tail piece 133 located between the spring members 233 and 234 carried on the quadrant 228. By referring to the drawings, and particularly Figs. 43 to 48, it will be noted that the upper end of the mandril 142 is provided with a V-slot 310, and into which the bevelled ends 308 of the plates 307 fit, the V groove 310 and bevelled ends 308 acting, therefore, as a positive means for bringing the lower ends of the spring plates 309 closer together and to grip therebetween the pile-up, composed of the strip of leather 232 and the tail piece 133. When the quadrant 228 is retracted or moved back to its initial position, the pile-up, composed of leather 232 and the tail piece 133, will be held in position with respect to the mandril 142 during the winding operation. Formed integral with the lever 293 and adjacent the ends thereof and extending downwardly is a lug 311 provided adjacent its lower end with a shaft 312 on which is rotatably mounted a cam roller 313 that engages with a cam 314 secured to or formed integral with the plate 270 and on the upper face thereof. Secured to a pin 315 on the lever 293 is one end of a spring 316, the other end of this spring being secured to a pin 317 on the arm 264, this spring 316 tending always to move the lever 293 counter-clockwise, as viewed in Fig. 7, about the shaft 265 as a center and, therefore, to constantly urge the member 293 downwardly within the tubular member 252. When the tubular member 295 moves upwardly so as to bring the bevelled ends 309 of the plates 307 out of the V notch 310, the spring 305 will move the spring plates 309 further away from each other and out of engagement with the picker head pile-up above referred to. The shaft 204 being continually rotating and also the tubular member 252 being constantly rotating in unison therewith, all parts associated with such rotating elements will also rotate in unison and this rotation is timed with respect to the rotation of the table 34 and associated parts. As the table 34 rotates step-by-step to bring the members 40, carrying the legs 123, through the mechanism for insuring that the legs 123 will be in proper position, the table 34 will be subjected to considerable strain if the toggle mechanism 124 for such legs 123 do not work properly. To relieve the table of any strain from this cause I have secured to the end of the member 87 by bolts 319 a member 320. This member is provided with a groove 321 with which the lugs 41 engage. As the table 34 rotates, the appropriate lug 41 will engage with the driving pin 243 on the lever 239 and the quadrant 228 will start to rotate at the same angular speed as the table 34. The picker head pile-up composed of the strip of leather 232 and the tail piece 133, will be carried forward and the end thereof will engage with the rear end of the mandril 142, which is in the position shown, for example, at this time in Fig. 10. The shaft 204 rotating will rotate the cams 269 and 314 and the cam 314, in advance of any movement of the lever 262, will allow the lever 293 to move downwardly, whereupon the spring plates 309 will be positioned on either side of the picker head pile-up and the mandril 142, and when the bevelled ends 308 of the plates 307 engage in the V notch 310 of said mandril 142, the spring plates 309 will exert a gripping tension on the picker head pile-up and on the mandril 142, so that when the quadrant 228 is returned to its initial position, as shown in Figs. 9, 11, and 12, the picker head pile-up will remain in association with the mandril 142. The lever 262 will now be allowed to move downwardly by the cam 269 carrying the rotating sleeve 252 therewith and before the members 285 thereon reach the lowermost position, the lever 262 will have moved the releasing rod 278 downwardly, bringing the end thereof into contact with the extension 277 on the release of the lever 274 and the end of said lever 274 engaging with the lateral projection 246 of the member 243, will release said member 243 from the lug 41, whereupon the spring 241 will return the quadrant 228 to its initial position. The tubular member 252 will be assumed at this time to have reached its downward position, and as it is continually rotating, the rubbing or cam members 288 thereon will engage with the strip of leather 232 and will wind the same about the tail piece 133 and the mandril 142, this movement being traced through Fig. 11 and into Fig. 12, where the winding of the leather strip 232 is shown completed.

Symmetrically and centrally disposed about the shaft 132 of the table 34 are the parallelly arranged and vertically extending stub shafts 322, on each of which is pivotally mounted a radially extending arm 323. The lower surface of each of these arms rests on the upper face of the table 34 and there are one of the arms 323 for each of the members 39, 40 and associated pairs of legs 123. In order to insure that the members 323 shall remain in appropriate relation with the table 34, I have secured to the outer end of each of said arms by screws 324 a hold-down arm 325, as clearly seen in Fig. 7. Secured to or formed integral with each of the arms 323 and at the outer end thereof is a gripping member 326, which gripping member is adapted to engage with the end of the now completely wound strip of leather 232. Associated with each of the arms 323 and secured to the table top by screws 327 is a plate 328, on which is pivotally mounted a latch member 329. Also secured to the upper surface of the table 34 and associated with each of the plates 328 is a latch spring 330 which holds the latch 329 in normally operative position. Formed on the arms 323 is a latch member 331 which co-operates with the latch member 329 for the purpose of holding the arm 333 in its outermost position with relation to the members 39, 40 and associated legs 123, or as shown at the left hand end of Fig. 52. Formed on the plate 328 is an abutment 332 for one end of a spring 333, another abutment 334 for such spring being formed on the arm 323. When the latch 329 is operated to release the latch 331, the spring 333 moves the arm 323 about its stub shaft 322 in a counter-clockwise direction or from the position shown at the left of Fig. 52 to that shown in the next adjacent picture of such figure. Formed on the end face of the plate 270 is a cam 335, which is adapted to engage at the proper time with a cam roller 336 pivotally mounted on one end of a lever 337, which lever is pivotally mounted on a shaft 338 carried by a bracket 339 secured to the frame 223 by bolt 340. The other end of the lever 337 is forked, as indicated at 341, and this forked end surrounds the upper end of a lever 342 that is pivotally mounted at 343 on a bracket 344 secured to the frame 223 by bolt 345. The other end of the lever 342 is associated with the latch 329. The cam 335 is so located with respect to the cams 269 and 314 that the tubular member 252 will not be moved upwardly a sufficient distance to free the holding members 288 from the completely rolled picker head, as shown in Fig. 12, but will be retained in the position shown in Fig. 12 until the latch 329 has been released to allow the holding member 326 to move from the position shown in Fig. 11 into the operated or holding position shown in Fig. 12. After the holding member 326 is in the holding position, the tubular member 252 and the gripping plates 309 may be moved upwardly. It has been found that the spring 333 is insufficient to produce the necessary tension on the holding member 326 to hold the strip of leather 232 in rolled position. I have therefore devised the following for increasing the tension applied by the member 326 to the rolled strip 232. Secured to the pivot end of the levers 323 by bolts 346 is a plate 347, one end 348 of which extends toward the center 342, while the other end has secured thereto a bolt 349 passing through a perforation in the arm 333 and being provided with nuts 350, a spring 351 on each bolt 349 being placed between the nuts 350 and the arm 323. In the plate 347 between the bolt 349 and the bolts 346 is an adjusting screw 352, the inner end of which engages with the arm 323, this mechanism adjusting the resilient connection between the arm 323 and the plate 347. Secured to the hub 117 on the upper end 116 of the shaft 22 is a cam plate 354, with which the ends 348 of the plates 347 are adapted to engage. Pivotally mounted on the cam plate 354 is a cam 355, a spring 356 between the end of the cam 355 and the hub 317 constantly urging said cam 355 about its pivot in a counter-clockwise direction, as viewed in Fig. 52. The cam end proper 357 houses within a notch 358 in the cam 354 and when the cam 355 is rotated in a clockwise direction, as viewed in Fig. 52, the cam surface 357 will be practically concentric with the cam surface of the cam 354, and the cam surface 357 will engage with the end 348 of the plate 347 and will exert a rotative movement on the arm 323 in a counter-clockwise direction, tending to move the holding element 326 thereon against the wound strip of leather 232 with a greater pressure than could possibly be exerted by the spring 333. As the ends 348 of the plates 347 must be engaged rather rapidly in succession, the cam face 357 of the cam 355 acts as a preliminary camming means and the cam 354 will retain the ends 354 in their cammed position for a predetermined length of time, or until after various operations have taken place on the wound-up strip of leather 332. Pivotally mounted on a shaft 359 on the cam member 354 is a latch lever 360, having a latch end 361 engaging with the cam end 358 of the cam 355 and pivotally attached to the other end of said latch lever 360 is one end of a link 362. The other end of this link is pivotally attached to one end of the connecting rod 363, which end of the connecting rod engages with the cam member 364 secured to the hub 117 by bolts 365. The other end of the connecting rod 363 is pivotally attached at one end of a member 366 slidably mounted in a bearing 367 secured to the frame 89, the other end of this member 366 having rotatably mounted therein a cam member 368. Secured to the shaft 93 is a cam 369 which engages with the cam roller 368 to impart a reciprocating motion to the connecting rod 363 at the proper instant to allow one end of such connecting rod to ride up on the cam 364 and rotate the latch 360 so as to have the end 361 thereof rotate the cam end 358 of the cam 355 in a clockwise direction so as to bring the surface of the cam 357 into registry with the cam surface of the cam 354. Under these conditions, therefore, the end 348 of the plate 347 that was engaged by the cam end 357 will be allowed to move smoothly over and onto the cam 354. The member 39 carrying the members 40 and legs 123, as well as the mandril 142 on which the strip of leather 232 has been wound, is now assumed to have moved from the position beneath the tubular member 252 into the next succeeding position and the next succeeding mandril 142 moved into position to have a strip of leather 232 wound thereon.

Secured to the member 87, adjacent the framework 223 in any suitable manner, as by bolts 370, is a base plate 371. This base plate is provided with guideways in its upper face, in which is slidably mounted a carriage 372, the carriage 372 sliding radially with respect to the table 34. Formed in the slidable member 372 and on the under face thereof is a notch 373 in which fits the upper cammed end 374 of a lever 375, this lever being pivotally mounted intermediate its ends on a shaft 376 secured to the frame member 83. The lower end of the lever 375 is provided with a laterally extending shaft 377 on which is rotatably mounted a cam roller 378 fitting into a cam groove 379 in the cam member 380. The cam members 380 and 98 are formed integral with each other, as clearly shown in Fig. 16. Rotation of the shaft 84 will cause a reciprocating movement of the sliding member 372 to take place in the guideways formed in the top surface of the base 371. Secured to the top of the slidable member 372 in any suitable manner is a member 381 having formed therein and extending longitudinally therethough a bearing for a shaft 382. This shaft at its outer end is provided with a grooved pulley 383, over which runs a belt 384, and by means of which power must be transmitted through any suitable source to rotate the shaft 382 in the direction of the arrow shown in Fig. 21. Secured to the end of the shaft 382 remote from the pulley 383 is a gear 385. Secured to the upper face of the slidable member 372 by screws 386 and in alinement with the member 381, is a member 387ª, in which are formed bearings for receiving the parallelly arranged shafts 387. On one end of each of the shafts 387 is secured a pinion 388, each of said pinions meshing with and being driven by the gear 385. The ends of the shafts 387 adjacent the gears 388 are cupped to engage with balls 389, each of which balls is housed in a perforation 390 in the member 381, and secured to such member 381 by screws 391 are adjusting screws 392. The ends of the adjusting screws 392 are cupped to engage with the balls 389, the cupped end of such bolts 392 extending into the perforations or housing 390 for this purpose. At the end of the shafts 387 remote from the gears 388 and without the limits of the bearings 386 are secured chucks 393, and in such chucks are frictionally held twist drills 394. The drills 394 rotate in the proper direction and at the proper speed, due to the driving mechanism above described and the lever 375 periodically moves the drills 394 to the right and then to the left, as viewed in Fig. 19. Secured to the base 371 by bolts 395 is a bracket or framework 396, which extends upwardly and toward the center of the table 34 and is provided at its extreme upper end with a shaft 397 extending transversely to the movement of the slidable member 372. Pivotally mounted on the shaft 397 is a bell crank lever, one arm 398 of which is provided with a machined end 399 for engaging with one face of a picker head comprised of a tail piece and a strip of leather 232. Also, this machined end 399 is provided with perforations in alinement with the drills 394. The other arm 400 of the bell crank lever has pivotally mounted at its free end a cam roller 401 adapted to be engaged by a cam surface 402 formed on a cam block 403 that is secured to the bearing member 386 by bolts 404. Secured to the arm 400, intermediate its ends, is one end of a spring 405, the other end of this spring being attached to the bracket or frame 396, and tends to rotate the bell crank lever about the shaft 397 as a center in a counter-clockwise direction. Secured to the side of the bracket 396 by bolts 410 is a member 411, the outer end of which is bent at right angles to the main portion, as indicated at 412, and is provided with alined holes in registry with the drills 394. Power being turned into the shaft 382 by means of the pulley 383 and belt 384, and the drills 394 being rotating in the proper direction and at the proper speed, it is assumed that the table 34 has rotated so as to bring a completely wrapped strip of leather 232 into proper position with relation to such drills 394 or as shown in Fig. 19. The shaft 84 being constantly rotating, the cam 379 will cause a rotation of the lever 375 about the shaft 376 and the slide 372 carrying the elements above described therewith will be moved to the right, as shown in Fig. 19. The drills 394 will start drilling the wound strip of leather 232 and also eventually through the tail piece 133 and as the slide 372 moves forward, the cam 402 carried thereon will engage with the cam roller 401 and will rotate the bell crank lever so as to bring the machined end 399 on the arm 398 thereof against the adjacent piece of the wrapped strip of leather 232. The further, the slidable member 372 is moved to the right, the greater will be the compression exerted by the machined end 399 on the rolled strip of leather 232, the right angled-portion 412 of the member 411 co-operating with the machined end 399 for this purpose. The drills 394 are moved forwardly far enough to completely drill through the rolled strip of leather 232 and associated tail piece 133 and are then moved back to their extreme left hand position, or to the position now shown in Fig. 19.

Secured to the top of the member 87 by bolts 415 is a standard 416 and secured to the top of such standard is a rivet holding magazine 417. This magazine is divided into two compartments by a partition 418 and each of the compartments has the lower portion thereof tapering inwardly and downwardly, as indicated at 419, and each of the compartments has in its lower or bottom portion a slot 420 in which is slidably mounted a blade 421. These blades are comprised of each of a pair of spaced plates 422, there being room enough in the space between each pair of plates for the reception of the body of rivets 423. Each blade 421 is secured at its lower edge to an arm 424, each of said arms having at their other end a hub 425, and these hubs are secured to a shaft 426 rotatably mounted in an elongated bearing 427 supported by arms 428 that are integral with the pedestal 416. Secured to one end of the shaft 426 and extending downwardly therefrom is a lever 429 and secured to the lower end of the lever 429 is a member 430, by means of a shaft 431, the shaft 431 being such that the member 430 has pivotal connection on the end of the lever 429. The member 430 is pivotally attached at 432 to one end of a connecting rod 433 and this connecting rod 433 has secured therein at its other end a shaft 434. Pivotally attached to the shaft 434 is an element 435, which is slidably mounted on a crank pin 436 secured to the upper face of a base plate 437. This base plate 437 is secured to the upper end of a shaft 438 which extends downwardly and has its lower end supported in a bearing 439 on a framework 440 secured to the upper face of the base 10. Secured to the shaft 438 adjacent the bearing 439 is a spiral gear 441 that meshes with and is driven by a similar spiral gear 442 secured to the shaft 84. The shaft 438 is driven in the direction of the arrow shown, for example, in Fig. 22. The blades 421 are given an oscillating motion about the shaft 426 as a center and the magazine 417, being assumed to have therein a quantity of rivets 423, such rivets will gradually be picked up by the blades 421. The ends of the blades 421 adjacent the shaft 426 are rounded, as indicated by the reference numeral 443 in Fig. 22, and the rounded end 443 is on the circumference of a circle of which the shaft 426 is the center. Secured to the magazine 417, one in each of the compartments thereof, are guideways 444, the edge thereof adjacent the rounded end 443 of the blades 421 being coincident therewith, as shown in Fig. 22. The upper edge of the guides 444 lie at an angle to the horizontal and each of these guides is provided with a slot 445 that is in alinement with the space between the plates 422 of the blades 421 and down which upper edge the rivets 423 may slide. The blades 421 oscillating in the magazine 417 will, as above stated, gradually pick up rivets 423 and as the blades 421 periodically come into registry with the guides 444, as clearly shown in Fig. 22, the rivets 423 will be transferred from the blades 421 onto the guides 444. At the delivery end of the guides 444 and secured to the frame or pedestal 416 are the tubular members 446, there being one of such members 446 for each of the guides 444. These tubular members 446 extend downwardly, as clearly shown in Fig. 2, and pass through alined perforations in a member 447 that is secured to the pedestal 416, such perforations bringing the delivery end of the tubular members 446 into close relationship with each other, as clearly shown in Fig. 29. Referring to Fig. 27, it will be noted that each of the tubular members 446 is cut away at 449 adjacent the delivery end of the guide 444. Formed integral with the frame 416 is a hub 450 and in which hub is slidably mounted a plunger 451, such plunger, as will be evident from an inspection of Fig. 27, extending laterally across the delivery end of the guide 444. A spring 354 secured to the side of the guide 444 by spring 453 engages with one end of the plunger 451 and normally tends to maintain the same in its downward position, as viewed in Fig. 27, or out of the boundaries of the tubular member 446. There is one of the plungers 451 for each of the tubular members 446 and to each of the plungers at the end thereof remote from the spring 452 is secured by screw 454 a bar 455 that is secured to a slidable shaft 456. Each of the shafts 456 is drilled at one end with an axial hole in which is slidably mounted a rod or shaft 457, and it will be seen, therefore, by reference to Fig. 23, that such shafts 456 have an axial movement toward and from each other without being drawn out of alinement. Each of the shafts 456 is provided with a through pin 458, with which is associated a washer 459 and such washers, one for each of the shafts 456, form an abutment for the ends of the coil spring 460, such coil spring surrounding the drilled end of each of the shafts 456 and such spring also tends to force the shafts 456 outwardly, as viewed in Fig. 23, or downwardly as viewed in Fig. 27, so as to move the plungers 451 outward with respect to the tubular member 446. Secured to each of the arms 424 by screws 461 are arcuate cams 462, which arcuate cams engage with the ends of the shafts 456 that are adjacent to the bars 455. As the arms 424 are rotated about the shaft 426 as a center, the arcuate cams 462 are also rotated about such shaft 426 as a center and will remain in engagement with the ends of the shafts 456 because of the presence of the spring 460 that is associated with both such shafts 456, and as the arms 424 rotate, the shafts 456 will be brought forward and from each other, such movement either toward or from each other taking place simultaneously so that the plungers 451 for each of the tubular members 456 will be brought into the boundaries of the tubular member 456 and then outwardly therefrom. The outer movement of the plungers 451 is so controlled by the cams 462 that such plunger will be drawn considerably away from the guide 444 so as to allow a single rivet 423 in each of such guides 444 to be positioned in front of the plunger 451, so that as the arms 424 are oscillated, the next oscillation will rotate the cams 462 so as to force the rods 456 toward each other, the plungers 451, under these circumstances, moving the positioned rivet into the open end of the tubular members 446. Secured to the pedestal 416 by bolts 463 is a bracket 464 in which is pivotally mounted one end of an arm 465. A spring 466 secured to one of the bolts 463 acts to urge the arm 465 about its pivot point in a counter-clockwise direction. Rotatably mounted on a shaft 467 on the arm 465 is a cam roller 468 which is adapted to engage with a cam 469 formed on a cam disc 470, such cam disc, in turn, being secured to the shaft 438 and rotating in the direction of the arrow shown, for example, in Fig. 29. Secured to the free end of the arm 465 by screws 471 is a spring plate 472, which normally rests beneath the delivery end of the tubular members 446 and closely adjacent thereto, the normal condition of the arm 465 being assumed to be that when the cam roller 468 is not in engagement with the cam 469. The spring plate 472 therefore acts as a shutter for the delivery end of the tubular members 446.

Secured to the pedestal 416 by bolts 473 is a bearing 474 which is in alinement with the bearing 475 secured to the member 89 by bolts 476. Rotatably and slidably mounted in the bearings 474 and 475 is a shaft 477, one end of such shaft—the end resting in the bearing 474—being enlarged in diameter and having cut in such enlarged portion a cam groove 478. Formed on the bearings 474 is an enlargement 479 perforated and in such perforation extends a cam pin 480, which enters into the cam groove 478. It is obvious, therefore, that if means is provided to impart to the shaft 477 a longitudinal movement that the cam groove 478 and cam pin 480 will simultaneously impart thereto a rotary movement, and the shape and extent of the cam groove 478 is such that the extent of the rotary movement of the shaft 477 is equal to ninety degrees. Secured to the shaft 477, adjacent one end thereof, is a member 481 provided with an annular groove 482 in which fits the diametrically arranged pins 483 carried by the forked end 484 of the lever 485, such lever being pivotally mounted on a shaft 486 secured in or to a bracket 487 on the member 87. The other end of the lever 485 is provided with a cam roller 488 which works in a cam groove 489 formed in the under face of the cam plate 470. As the shaft 438 rotates in the direction of the arrow shown, the cam 49 will impart an oscillatory movement to the lever 485 and the shaft 477 will be periodically moved longitudinally of itself, while being also rotated through an angle of ninety degrees. Secured to the shaft 477 is a lateral projecting member 478ª, and slidably mounted in such member 478ª and transversely thereof are parallelly arranged rods 490. The member 478ª in the space between the rod 490 is cut away to provide a housing for rivet holding members 491 and 492 respectively, and the member 491 is secured to the ends of the rods 490 and reciprocates in the housing with such rods 490. The rivet holding member 492 fits within the member 489 and has the rods 490 passing through, as clearly shown in Fig. 35. Each of the shafts 435 is threaded at the end remote from the rivet connection to the rivet holding device 491 and adjustably mounted in such threaded ends by means of adjusting screws 493 is a plate 494 provided at its central point and at a side remote from the rivet holding member 492 with a knob 495. Between the adjusting nuts 493 and the rivet holding member 492 and on each of the rods 490 is a spring 496 which tends to draw the rivet holding member 491 into close association with its companion member 492. The rivet holding members 491 and 492 are adapted to receive a pair of rivets 423, the members being cut away for this purpose, as clearly shown in Fig. 36. Within the member 478 and on each side of each of the places where the rivets 423 will fit, are spring pressed holding balls 497, which balls prevent the rivets 423 from dropping too far inward in the block 478 with relation to the holding jaws 491 and 492. Secured to the bracket 475 by bolts 498 is a member 499 in which is rotatably mounted a shaft 500. Secured to the shaft and extending laterally outward therefrom is a latch plate 501, the outer end of which is adapted to be engaged by the block 478, as the same is moved longitudinally and rotatably into the position shown in Fig. 29. Also secured to the shaft 500 is a plate 502, extending at substantially right angles to the plate 501 and adapted to engage with the button 495 on the plate 494. Also secured to the shaft 500 is an arm 503, to the free end of which is secured one end of a spring 504, the other end of this spring being attached to the bracket 475 and which tends to rotate the shaft 500 in a counter-clockwise direction so as to lower the front end of the plate 501. As the shaft 427 is rotatably and longitudinally moved by the lever 485 into the position shown in Fig. 29, the block 478 will engage with the free end of the plate 501 rotating the shaft 500 in a clockwise direction and bringing the plate 502 into engagement with the button 495, thus moving the pair of rods 490 to the left, as viewed in Fig. 35, and moving the clamping jaw 491 away from the clamping jaw 492. Simultaneously, the cam 469 on the cam plate 470 has engaged with the cam plate 468 and has moved the spring plate 472 out from under the delivery end of the tubes 446. The pair of rivets 423 which are supposed to be, at this moment, housed in the tubular member 446, are dropped into the openings between the clamping jaws 491 and 492, the downward movement thereof being arrested by the spring pressed balls 497, as clearly shown in Fig. 36, these springs aiding in positioning the rivets 423 in the block 478. The continued rotation of the shaft 438 in the direction of the arrow shown in Fig. 29 will cause a return movement of the spring plate 472 beneath the delivery end of the tubular members 446 and a combined rotary and longitudinal movement of the shaft 447, this shaft carrying the block 478 therewith, or into the position shown in Fig. 31, where the rivets 423 will be in alinement with the holes in the picker head.

As the block 478 was moved into the position shown in Fig. 29 to receive in the rivet holding jaws 491 and 492, the pair of rivets 423, the table 34 was rotated another step to bring a drilled picker head into the position shown in such figures, and after the block 478 has been positioned with the rivets 423 in alinement with the holes in the picker head, plungers 508 are automatically moved forward to transfer the rivets 423 from the block 478 and into the holes in the picker head. The plungers 508 are slidably mounted in the perforations in the frame 416 and are secured at their outer ends to a block 509. This block 509 is slidably mounted on a finished boss 510 formed integrally with the frame 416 by screws 511, such screws passing through slots 512 in the block 509. The rear end of the block 509 is pivotally attached to the lower end of the lever 512, such lever being pivotally mounted on a shaft 513, mounted in the framework 416. Intermediate the ends of the lever 512 is a shaft 514, to which is pivotally attached one end of a connecting rod 515. The other end of this connecting rod is pivotally attached at 516 to one end of a lever 517. The lever 517 is pivotally mounted on a shaft 518 mounted in the frame 416. The end of the lever 517 remote from the shaft 516 is forked, as indicated at 519, in Fig. 33 and a shaft 520 passes through such forked end 519 and between the tines of the forked end 519 and on the shaft 520 is rotatably mounted a roller 521. Secured to the frame 416 by bolts 522 is a pedestal 523 carrying at its top end a shaft 524, on which is mounted a lever 525. One end of said lever is forked, as indicated at 526 in Fig. 33, and in the ends of the tines of the fork are located shafts 527, these shafts being arranged parallel to each other and on each of said shafts is rotatably mounted a member 528. It will be obvious, therefore, that regardless of the angular position of the lever 525 with respect to the shaft 524, the roller 521 will always be engaged by flat faces of the members 528. Secured to the shaft 93 is a cam 529 provided with a cam race 530 which engages cam rollers 531 in the forked end 532 of the lever 525, and which cam race imparts an oscillatory motion to the lever 525 as the shaft 93 rotates. This oscillatory movement of the lever 525 will cause an oscillatory movement of the lever 517 about the shaft 518, and therefore an oscillatory movement of the lever 512 about the shaft 513, this in turn causing an oscillatory movement of the block 509, thereby insuring that the plungers 508 are alternately moved forward and backward, toward and from the block 478. As the movement of the block 478 into the position shown in Fig. 31 found a picker head with the holes drilled therein in position to receive the rivets 423, it will be assumed that the plungers 508 have been moved forward by the mechanism just described to move the rivets 423 out of the block 478 and into the perforations in the picker head or into the position shown in Fig. 31. The cam 529 has the cam race 530 of such shape as to maintain the plungers 508 in the position shown in Fig. 31 for a predetermined period.

Secured to the frame 416 by bolts 533 is a framework 534 and secured to said framework by bolts 535 is a member 536, which extends upwardly at an angle to the perpendicular, as clearly shown in Figs. 22 and 25, formed integral with the member 36 and on one side thereof are alined bearings 537 in which is rotatably mounted a shaft 538, this shaft extending upwardly to any appropriate distance and having secured at its top end a grooved pulley 539. Secured to the upper end of the shaft 93 is a grooved pulley 540 and over the grooved pulleys 539 and 540 runs a belt 541, idler pulleys 542 and 543 rotatably mounted on suitable bearings attached to the mechanism being utilized to insure that the belt 541 properly engages with the pulleys 539 and 540. Secured to the member 536 adjacent the top bearing 537 is a circular dish 544 and secured to the shaft 538 within the confines of the dish 544 is a member 545. This member extends radially outward from each side of the shaft 538 to practically the full diameter of the dish 544 and the dish 544 is a magazine for holding washers 546 to be used in connection with the rivets 523. At the lowest point of the dish 544 are two gates 547, arranged as shown in Fig. 25, and the effective size of such gates may be varied by appropriate openings in the plate 548 secured to the inner face of the dish 544 by screws 549. Secured to the under face of the dish 544 by screws 550 is a plate 551, this plate acting as a support for the upper end of a plate 552, such plate being secured to the plate 551 by screws 553. The plate 552 extends downwardly and is secured at its lower end to an element 554 by screws 555. Formed on the outer or upper surface of the plate 552 are guideways 556ª down which are led the washers 546. As the shaft 538 rotates, moving the washers in the dish 544 such washers will gradually be fed into the gates 547 and can only be fed in through said gates in the proper position because of the shape of the gateway.

The element 554 is secured by screws 556 to two plates 557, there being one of such plates on either side of the element 554, as clearly shown in Fig. 29. The plates 557 are each provided with a slot 558 through which pass as a sliding fit screws 559, and by means of which the plates 557 are slidably mounted on a member 560. The member 560 is slidably mounted in a guide 561 formed at the lower end of the frame member 534, this guide 561 being substantially rectangular in cross section, as is also the member 560. Secured to the front face of the member 560 or the right-hand portion thereof, as viewed in Fig. 9, and in any suitable manner is a plate 562, which is provided with two perforations, each of which allows passage of a coil spring 564. Tubular members 565, one for each of the coil springs 564, are affixed to the front wall 566 of the member 560, and these tubular members extend through alined perforations in the element 554. The coil springs 564 surrounding the tubular members 565 act to force the element 554 to the right of the front wall 566 of the member 560, as viewed in Fig. 29. In alinement with the perforations in the element 554 and in the plate 552 are perforations that extend across the guideways 556ª and with each such perforation is associated a spring wire loop 568 which prevents the accidental dropping out of the guides 556ª of the washers 546, as clearly shown in Fig. 30, and also in Fig. 28. Associated with each of the tubular members 565 and mounted for reciprocation therein are riveting plungers 569, each riveting plunger being secured to its own anvil crosshead 570, as clearly shown in Figs. 30 and 31. Each crosshead 570 is provided with a centrally arranged cut-away portion 571 and with a cam stop or plate 572 that extends into the centrally arranged perforation 571 for a purpose to be hereinafter described. Secured to each crosshead 570 are a plurality of rods or shafts 573, such rods extending rearwardly or to the left of the crossheads 570, as viewed in Figs. 29, 30 and 31, through a plate 574 and through the rear wall 575 of the member 560. Surrounding each rod or shaft 573 is a coil spring 576, one end of each of which abuts against the rear wall of the crossheads 570 and the other end abuts against the plate 574 above referred to. The crossheads 570 are capable of reciprocating movement within the members 560 and against the tension of the springs 576 in one direction, the springs 576 acting as the driving means for returning the crossheads 570 to their initial position. Within the front wall 566 of the member 560 are arranged a plurality of resilient buffers 577, the rear ends of which extend into the chamber within the member 560, and such rear ends are adapted to be engaged by the front wall of the crossheads 570, when such crossheads are returned to their initial position by the springs 576. Threaded through the rear wall 575 of the member 560 are a plurality of adjusting screws 578, the inner ends of which are in engagement with the plate 574 and by means of which the tension of the springs 576 may be adjusted. Rotatably mounted in the framework 534 is a shaft 579, to the upper end of which is secured a pulley 580. Secured to the framework 534 is a motor or other prime mover 581, on which is a pulley 582. Over the pulleys 580 and 582 runs an endless belt 583 by means of which power is transmitted by the motor 581 to rotate the shaft 579 in the direction of the arrow shown, for example, in Fig. 26. The shaft 579 extends downwardly through the framework 534 into the chambers formed within the crossheads 570 and keyed to such lower end of the shaft 579 are cams 584, there being one such cam for each of the crossheads 570. Each cam is so shaped as to strike once against the cam element 572 of each crosshead, twice for each revolution of the shaft 579 when the crossheads 570 are brought into position to allow of such engagement. The side walls of the framework 534 on either side of the guide 561 are slotted, as indicated at 585, to allow limited sliding movement of stub shafts 586 that extend therethrough and are screwed into the side walls of the member 560, as clearly shown in Fig. 34. On each of the stub shafts 586 is pivotally mounted the lower end of a lever 587, each such lever being pivotally attached at its upper end to a stub shaft 588 in the frame member 534. Intermediate the ends of each of the levers 587 is arranged a shaft 589, on which is rotatably mounted one end of a connecting rod 590, and the other end of each of these connecting rods is pivotally mounted on the shaft 520, above described as forming a mounting for the forked ends 519 of the lever 517 and for the cam roller 521. When the plungers 508 position the rivets 423 within the perforations in the picker head, the levers 587 swing about their pivot points 588 so as to move the member 560 forwardly or to the right, as shown in Fig. 29, and the tubular members 566 likewise move forwardly and push the lowest pair of washers 546 outward beyond the wire loops 568 and onto the ends of the rivets 523, the plate 552 and parts carried thereby that are mounted on the member 554 being yieldingly held against the side of the picker head to force the same upward onto the rivets 423. The levers 587 move from the position shown in Fig. 30 gradually into the position shown in Fig. 31 and when they have moved far enough, the crossheads 570 will be acted upon by the cams 584, which, together with the springs 576, will impart a reciprocating motion to the riveting plungers 569 to rivet the head over the rivets 423 onto the washers 546. Continued oscillation of the lever 525 will cause, through the connecting rods 590, a return of the member 560 to its initial position, as shown in Fig. 30, and also this oscillatory movement of the lever 525 will cause a return of the plungers 508 from the position shown in Fig. 31 to that shown in Fig. 30, and the now riveted picker head carried on the mandril 142 is allowed to move onward with the rotary movement of the table 34. The table in its next movement stops in position to have the riveted picker head depressed and compressed.

Secured to the member 119 by bolts 591 and depending downwardly therefrom toward the table 34 is a member 592, adjacent the lower end of which is pivotally mounted on shaft 593, a latch 594. To one end of the latch 594 is attached the lower end of a coil spring 595, the upper end of this coil spring being attached to a pin 596 on the member 119. The end of the latch 594 remote from the spring 595 lies normally in the path of the arms 323 as the table 34 is rotated and such latch 594 is located so as to engage the arms 323 after they have rotated beyond the riveting station above described. As it is no longer necessary to apply pressure to the coiled strip of leather 232 after the same has once been riveted, the latch 594 is employed to rotate the arms 323 into their normally latched position, that is, into the position shown at the left of Fig. 52. Prior to this rotary movement on the part of the arms 323, the cam plate 344 thereon has moved beyond the limits of the cam 354, this being necessary to allow the rotative movement above described. On the framework 434 are arranged slideways 600, these slideways being in alinement with each other and slidably mounted in such slideways is a reciprocating bar 601. Beneath the uppermost slideways 600 but adjacent thereto and on the slidably mounted member 601 are secured by pins or in any other suitable manner, limiting stops 602 and against which may contact the forked end 603 of a lever 604, such forked end 603 encircling the reciprocating member 601.

The lever 604 is pivotally mounted on a shaft 605 in the framework 434 and at the end thereof remote from the forked end 602 is rotatably mounted a cam roller 606, which engages with a cam race 607 formed in the cam member 608 that is secured to the shaft 93 adjacent its upper end by pin 609 or in any other suitable manner. Rotation of the shaft 93, therefore, will cause a reciprocating motion of the member 601 in the slideway 600. To the lower end of the reciprocating member 601 are secured by bolts 610 and nuts 611 downwardly depending plates 612, there being one such plate on either side of the reciprocating member 601. The member 601 is of such width that the distance between plates 612 will be substantially equal to the thickness of the mandril 142. Also secured to the reciprocating member 601 by the bolts and nuts 610 and 611 respectively, is a member 613, which, in the downward movement of the reciprocating member 601, will engage with one end of the latch 594 and will rotate said latch about its pivot shaft 593 after the latch members 329 and 331 have come into engagement with each other to hold the arm 323 in the position indicated at the left hand side of Fig. 52. The table 34 rotating with a step-by-step movement, it is obvious that the now-riveted picker head carried on the mandril 142 will come under the spaced plates 612 and under the reciprocating member 601 and will be brought to rest in this position. Continued rotation of the shaft 93 will cause at this time a downward movement of the reciprocating member 601 and the spaced plates 612 engaging with the upper end of the rolled strip of leather 132, forming with the tail piece 133 a picker head, will be forced downwardly on the mandril 142, or from the position shown in Fig. 40, into the position shown in either Figs. 46, 47, 48, or 42. That is, the now-completed picker head will be forced downward on the mandril 142 into the chamber defined by the jaws 136 and plates 139. It will be noted by reference to Fig. 42, for example, that the mandril 142 is tapered at the bottom of the chamber above referred to and that forcing the now-completed picker head down onto the large end of the mandril, that the hole therein is enlarged, but enlarged only to the proper size as, in order to obtain the necessary tightness of winding, it has been found preferable to wind the strip 232 of leather on a mandril smaller than the finished article is to be. After the depressing operation, and before the table 34 has been moved from its initial position, the rotary movement of the shaft 46 will cause the cam 154 to engage with the roller 126 and will force the lower end of the legs 123 outward away from each other so as to compress the picker head in the chamber defined by the jaws 136 and side plates 139. The table 134 will now rotate in the usual manner through another step, and the roll 216 on the shaft 125 will engage with the cam plate 155 which will hold the lower ends of the legs 123 in their outermost position until all mechanism mounted on the base 10 has been cleared. As has been above described, the links 124 act as toggle levers and when a picker head has been compressed in the manner above described, the links 124 will remain in their uppermost position, forcing the lower end of the legs 123 outward from each other. The cam plate 155, therefore, is only necessary because of the fact that sometimes a member 39 with the parts above described thereon will have passed through the winding station without a strip of leather 232 being placed therein and under these circumstances there is no assurance that the links 124 will remain in their uppermost position.

Assuming that the apparatus has been constructed and assembled as above described, and that it is desired to manufacture picker heads thereon, the operator will turn power into the machine from any suitable source in the usual manner, and through the pulleys 16, whereupon the shaft 15 will rotate in the direction of the arrow shown in Fig. 5, and a reciprocating movement will be imparted to the rotatably mounted driving frame 23 at every other revolution of the shaft 15 by the means specifically described for this purpose. The table 34 will, therefore, have imparted to it an intermittent step-by-step rotary movement, being locked in fixed position at the end of each intermittent step, so as to bring the members 39 with the mechanism above described mounted therein in operative relation to the various working instrumentalities peripherally arranged about the table 34. These working instrumentalities are specifically the winding mechanism, the drilling mechanism, the rivet feeding mechanism, the washer feeding mechanism, the riveting mechanism, the depressing mechanism, the compressing mechanism, and the ejecting mechanism. The devices are arranged in the order named, although the ejecting mechanism is widely separated from the depressing and compressing mechanism as it has been found advisable to place the same as closely adjacent the winding mechanism as possible in order to give all possible time for the completed picker head to obtain a permanent set, which it will do in the compressing mechanism. The completed picker head is, therefore, maintained in compressed condition throughout a major portion of a complete revolution of the table 34. Power having been turned into the machine as above described and the table 34 being rotated step-by-step, the ejecting mechanism, comprised essentially of the ejecting rods 151 and the necessary mechanism for operating the same at the proper time, as clearly shown in Fig. 50, operates to eject from the chamber, composed of the jaws 136 and plates 128, any material contained therein. The legs 123 will be opened prior to the operation of the ejecting mechanism by having the links 124 engage with the cam surface 219 so that the ejecting mechanism may properly function and the cam 207 is provided to insure that the legs 123 are maintained in proper position until each particular element 39 with the mechanism mounted thereon has passed through the winding station. At this particular time it is assumed that the element 39 carrying the mechanism thereon, which includes, for example, the upstanding mandril 142, is moving intermittently step-by-step about its central point. The operator, therefore, will take a strip of leather 232 and a tail piece 133 and will place them in the slide of the quadrant 228 in the position shown, for example, in Fig. 9. The projection 41 of the particular member 39 and associated parts will engage with the driving plunger 243 on the lever 239 so as to cause a rotary movement of the quadrant 228 in a clockwise direction about its shaft 227 and at the same surface speed as the table 34. The quadrant 228 will now have assumed the position shown in Fig. 10 and at this particular time the cam 314 will have allowed the lowering of the lever 293 and a consequent lowering of the elements 294 and 295 and the spring plates 309 associated therewith and at the lower end thereof, such spring plates 309 being positioned, as shown in Fig. 10, on either side of the mandril 142, and also on either side of the tail piece 133 and the end of the strip of leather 232. When the quadrant 228 has moved forwardly so as to bring the end of the tail piece 133 and strip of leather 232 into engagement with the back of the mandril 142 and the spring plates 309 have grasped the same, as shown in Fig. 10, the cam 269 will have rotated so as to allow the lever 262 to move downwardly and, therefore, cause a simultaneously moving down of the tubular member 252 bringing the winding mechanism therewith and also moving the releasing rod 278 downwardly, the lower end of this rod engaging with the plate 277 on the lever 274, and the end of this lever engaging with the lateral projection 246 of the driving plunger 243, will release such driving plunger from engagement with the plug 41, whereupon the spring 241 will rotate the quadrant 228 back into its original or initial position, as indicated in Fig. 11. The tubular member 252 being rotated through the train of gears 255, 256, 257ª and 258 will wind the strip of leather 232 about the mandril 142 and tail piece 133, passing from the position shown in Figs. 10 to that shown in Fig. 12, where the winding of the strip of leather 232 is completed. As the winding is completed, the shaft 204 being constantly rotating, will rotate the cam plate 270 and the cam 335 thereon will engage with the roller 336 of the lever 337, which, in rotating, will operate the release lever 342, which in turn throws the latch 329 out of engagement with its companion member 331, and the spring 33 will force one of the arms 323 in a counterclockwise direction about its shaft 322 so as to bring the clamping member 326 into engagement with the wound-up strip of leather 232, as clearly shown in Fig. 12. The shaft 93 rotating in the direction of the arrow shown in Fig. 5, for example, will rotate the cam 369, which cam engaging with the roller 368 will move the connecting rod 363 so as to cause a rotation of the cam 357 about its pivot point, moving the cam into engagement with the cam plate 347, and by means of which an added pressure is obtained on the clamping member 326. It will be noted that the cam 357, by means of the connecting rod 363, has been moved into alinement with the cam member 354, so that as the table 34 rotates, it is possible for the end 348 of the member 347 to move off the cam 357 onto the cam 354 without any appreciable change in the pressure exerted. At this time there is imparted a step onward to the table 34, moving the mandril 142 on which the strip of leather 232 has just been wound into the drilling position and bringing the next succeeding mandril 142 into association with the winding mechanism to have another strip of leather 232 wound thereon. The drilling mechanism is illustrated in Figs. 16, 17, 18 and 21, and it will be obvious that when the mandril 142, with the wound strip of leather thereon, has been positioned with relation to the drills 394, that such drills, rotating by means of the mechanism just described, will be moved forward by means of the operation of the cam 379 and lever 375, this mechanism being clearly shown in Fig. 19. The drilling of the first wound strip of leather 232 on the mandril 142 having been accomplished, the mechanism at the winding station will have simultaneously wound another strip of leather 232 on the succeeding mandril 142 and the table 34 is now moved forward another step, bringing a new mandril 142 into association with the winding mechanism, bringing the then just completely wound strip 232 into association with the drilling mechanism and bringing the first wound strip 232 into association with the riveting mechanism. The rivet magazine 417 being constantly in operation, there will have been fed into the tubular members 446, by means of the oscillating plates 421, a pair of rivets which will be located at the bottom of the members 446, and which will be prevented from dropping out of such members because of the presence of the shutter plate 472. Also, washers from the washer magazine 544 will have been fed down the guides 556 and a pair of such washers 546 will be positioned at the delivery end of such guides 544, as clearly shown in Fig. 30. At the proper instant, determined by the mechanism above described, the shutter plate 472 will be moved away from the exit end of the tubular members 446, and a pair of rivets 423 will be dropped into the jaws 491 and 492 of the rivet holding mechanism mounted on the block 478 and carried by the rotatably and slidably mounted shaft 477. The shaft 447 is now rotated to bring the block 478 from the position shown in Figs. 23 and 29, and into the position shown in Fig. 31, where the plungers 508 are operated to force the pair of rivets 423 out from between the jaws 491 and 492 and into the perforations formed by the drills 394 in the strip of leather 232 and tail piece 133. After this operation, the levers 590 are operated to move the mechanism shown in Fig. 30 downwardly or to the right, bringing the tubular members 565 thereon into position to engage with a pair of washers 546 which are moved outwardly and positioned on the washers 423, as shown in Fig. 31. Continued movement of the connecting rod 590 moves the mechanism shown in Figs. 30 and 31 into operative position, where the constantly rotating shaft 479 carrying the cams 584 thereon, will operate the riveting plungers 569 in conjunction with the springs 576, and head over the ends of the rivets 423. The rivet placing, washer placing, and riveting operations above described take place while the table 34 has remained stationary, and while the drilling operation has been performed on the next succeeding strip of leather 232 and while the second succeeding strip of leather 232 has been wound on a mandril 142. The table 34 now takes another step forward and as the use of the clamping member 326 is no longer necessary, the arm 323 will come into engagement with a latch 594 carried on the member 119, so that the continued forward movement of the table 34 will cause a rotating movement of the arm 323 which will continue until the latching members 329 and 331 are brought into engagement with each other and the arm 323 now again locked in inoperative position, as shown at the left of Fig. 52. The shaft 93 rotating will, through the cam 608, cause a rotary movement of the lever 604, which in turn causes a downward movement of the reciprocating member 601 that carries at its lower end the spaced plates 612 and these spaced plates 612, engaging with the top of the wound-up strip of leather 232, will force the same downwardly on the mandril 142 or from the smaller portion thereof onto the larger portion, as clearly shown in Fig. 42. After the depressing of the now practically completed picker head has taken place, the rotation of the shaft 46 will have caused an oscillatory movement of the cam 154, which cam, by engaging the roller 126 carried on the links 124, will move such roller upwardly, forcing the lower end of the legs 123 outward with respect to each other and compressing the now completed picker head between the jaws 128 and plates 130. The table 34 now moves forward another step and it is to be understood that the operation of winding a strip of leather and a tail piece on a mandril, the drilling of the strip of leather and tail piece, the application of the rivets, washers and the riveting operation, the depressing operation, and the compressing operation take place simultaneously, there thus being a plurality of operations being simultaneously performed by the machine. The machine, therefore, moves forward step-by-step, the completed picker head remaining under compression until the ejecting operation is to be performed, at which time the roller 216 at the lower end of the links 124 are engaged by the cam mechanism shown in Figs. 49 to 50, when the roller 126 and, therefore, the links 124 will be moved downward to their lowest point, therefore bringing the lower ends of the legs 123 toward each other and relieving the compression exerted on the completed picker head by the jaws 129 and plates 130. At this time the ejecting mechanism shown in Fig. 50 will be operated to move the ejecting rods 148 upwardly, forcing the completed picker head off the mandrel 142, where it is taken by the operator and placed in a suitable receptacle.

While I have necessarily described the preferred embodiment of my invention somewhat in detail, it is to be understood that I may vary the size, shape, and arrangement of parts comprising my device within wide limits without departing from the spirit of the invention.

Having thus described my invention, what I claim as new is:

1. That improvement in the art of manufacturing picker heads which consists in associating a tail piece and a strip of leather with a mandril, winding the strip of leather about the mandril and tail piece to form a picker head with an opening smaller than in the finished article holding the strip of leather on the mandril and tail piece, while drilling the same for the reception of rivets, applying rivets and washers and heading over the rivets on the washers, increasing the size of the opening through the picker head to the correct finished size, compressing the strip of leather and tail piece while maintaining the finished size of the opening therethrough, and holding the picker head compressed for a predetermined length of time.

2. In a machine for making picker heads for loom picker sticks, the combination of a mandril, a winding head, means for feeding a strip of leather to the mandril and for operating the winding head to automatically wind the strip of leather on the mandril means associated with the mandril for clamping the wound strip of leather to the mandril, a drilling mechanism for drilling a plurality of holes through the wound strip of leather, a rivet holding magazine, means associated therewith and with the wound strip of leather for receiving rivets from the magazine and positioning the same in the perforations in the strip of leather, a washer holding magazine, means associated therewith for delivering the washers from the magazine and positioning the same on the free ends of the rivets, means for automatically heading over the rivets on the washers, and means for compressing the rolled strip of leather comprising the picker head to finished size.

3. In a machine for automatically manufacturing picker heads for loom picker sticks, the combination of a winding head, a drilling mechanism, rivet applying means, washer applying means, riveting means, sizing means and compressing means arranged in succession, and means for moving a mandril into association with each of said instrumentalities step-by-step.

4. In a machine for automatically manufacturing picker heads for loom picker sticks, the combination of a winding head, drilling mechanism, rivet delivering means, washer delivering means, riveting apparatus, sizing means, and compressing means arranged in series and a plurality of mandril carrying means movable step-by-step from one of said instrumentalities to the other, whereby a strip of leather is successively operated on to produce a finished picker head.

5. In a machine for automatically manufacturing picker heads for loom picker sticks, the combination of a rotatably mounted table, means for rotating said table intermittently step-by-step, a plurality of mandrils carried thereby, and a winding head associated with said rotatable table for winding strips of leather in succession on each of the mandrils, as presented.

6. In a machine for automatically manufacturing picker heads for loom picker sticks, the combination of a rotatably mounted table, a plurality of mandrils symmetrically arranged about said table and adjacent the periphery thereof, means for rotating the table by an intermittent step-by-step movement, the length of each step being equal to the peripheral distance between mandrils, an ejecting mechanism, a winding head, a drilling mechanism, rivet and washer applying means and a riveting means, a sizing means and a compressing device arranged about the periphery of said table, each of said instrumentalities performing its separate operation on picker head material associated with each of said mandrils simultaneously.

7. In a machine for automatically manufacturing picker heads for loom picker sticks, the combination of a mandril, means for winding a strip of leather tightly about said mandril to form a coil having an opening therethrough of less cross-sectional area than a finished picker head, means for automatically holding said strip of leather in wound position on the mandril, means for automatically applying rivets and washers to the coiled strip of leather, and means for automatically removing the holding means from the coiled strip of leather after the application of the rivets and washers.

8. In a machine for automatically manufacturing picker heads for loom picker sticks, the combination of a mandril, means for winding a strip of leather tightly about said mandril to form a coil having an opening therethrough of less cross-sectional area than a finished picker head, means for automatically holding said strip of leather in wound position on the mandril, means for automatically applying rivets and washers to the coiled strip of leather, means for automatically removing the holding means from the coiled strip of leather after the application of the rivets and washers, and means for increasing the cross-sectional area of the opening through the coiled strip of leather to the finished size required in a picker head.

9. In a machine for automatically manufacturing picker heads for loom picker sticks, the combination of a mandril, means for winding a strip of leather tightly about said mandril to form a coil having an opening therethrough of less cross-sectional area than a finished picker head, means for automatically holding said strip of leather in wound position on the mandril, means for automatically applying rivets and washers to the coiled strip of leather, means for automatically removing the holding means from the coiled strip of leather after the application of the rivets and washers, means for increasing the cross-sectional area of the opening through the coiled strip of leather to the finished size required in a picker head, and means for compressing the coil of leather and to retain the same compressed for a predetermined length of time.

10. In a machine for automatically manufacturing picker heads for loom picker sticks, the combination of a rotatably mounted table, a plurality of mandrils circumferentially arranged about said table, a compressing chamber associated with each said mandril, a compressing means associated with each compressing chamber, means for forming a coil of leather about the upper end of each said mandril, means for forcing the coil of leather downward into said compressing chamber, and means for automatically operating the compressing means to compress the coil of leather therein.

11. In a machine for automatically manufacturing picker heads for loom picker sticks, the combination of a rotatably mounted table, a winding head associated therewith, a plurality of mandrils circumferentially and symmetrically arranged about the periphery of the table, means for intermittently rotating the table to bring the mandrils successively into operative relation with the winding head, means associated with each mandril for clamping a strip of leather in wound condition to each mandril, a compressing chamber associated with each mandril, means for forcing a coil of leather downward on the mandril to size the opening therethrough and into the compressing chamber, and means for compressing the picker head so positioned.

12. In a machine for automatically manufacturing picker heads for loom picker sticks, the combination of a rotatably mounted table, a winding head associated therewith, a plurality of mandrils circumferentially and symmetrically arranged about the periphery of the table, means for intermittently rotating the table to bring the mandrils successively into operative relation with the winding head, means associated with each mandril for clamping a strip of leather in wound condition to each mandril, a compressing chamber associated with each mandril, means for forcing a coil of leather downward on the mandril to size the opening therethrough and into the compressing chamber, means for compressing the picker head so positioned for a predetermined length of time, and means for automatically ejecting the compressed picker head from the chamber and from the mandril.

13. In a machine for automatically manufacturing picker heads for loom picker sticks, the combination with a winding head, of means for automatically positioning a mandril associated with the winding head in preparation for winding a picker head thereon, clamping means associated with each mandril, operating means for said clamping means, and automatic means for moving the clamping operating means to open position prior to the positioning of the mandril with relation to the winding head.

14. In a machine for automatically manufacturing picker heads for loom picker sticks, the combination of a mandril, a winding head for automatically winding a picker head thereon, a clamping device surrounding said mandril and at the lower end thereof, means for moving the picker head longitudinally of the mandril and into operative position with relation to the clamping means, means for moving said clamping device to operative position, means for moving said clamping device to inoperative or open position and an ejecting device for ejecting the picker head from the mandril.

15. In a machine for automatically manufacturing picker heads for loom picker sticks, the combination of a winding head, a plurality of mandrils, means for moving said mandrils successively into operative relation with the winding head, a material feeding means associated with the winding head, and means associated with each mandril for moving the feeding means into operative position successively.

16. In a machine for automatically manufacturing picker heads for loom picker sticks, the combination of a winding head, means for feeding material thereto, a rotatably mounted table, a plurality of mandrils arranged about the periphery of said table, and means for rotating the table intermittently step-by-step to bring the mandrils successively into association with the winding head.

17. In a machine for automatically manufacturing picker heads for loom picker sticks, the combination of a winding head, a plurality of mandrils, means for bringing said mandrils successively into operative relation with the winding head, a clamping device associated with each mandril for holding the picker head clamped to the mandril during the process of manufacture, and means for automatically increasing the tension in the wound picker head after the winding operation is completed.

18. In a machine for automatically manufacturing picker heads for loom picker sticks, the combination of a winding head, a material feeding means associated therewith, a mandril, and means for simultaneously bringing the mandril into operative relation with the winding head and the material into operative relation with the mandril.

19. In a machine for automatically manufacturing picker heads for loom picker sticks, the combination of a winding head, a material feeding means associated therewith, a mandril, and means for simultaneously moving the mandril and material feeding means into association with the winding head and in synchronism with each other.

In testimony whereof, I have signed my name to this specification.

JOSEPH H. CHADBOURNE.